US012324776B2

(12) United States Patent
Vytla et al.

(10) Patent No.: US 12,324,776 B2
(45) Date of Patent: Jun. 10, 2025

(54) PATIENT SUPPORT APPARATUS FOR TREATING PATIENTS PRESENTING BEHAVIORAL HEALTH INDICIA

(71) Applicant: Stryker Corporation, Kalamazoo, MI (US)

(72) Inventors: Lavanya Vytla, McKinney, TX (US); Matthew A. Cutler, Portage, MI (US); Michael William Graves, Paw Paw, MI (US); Paul Mandruch Radgens, Vicksburg, MI (US); Christopher Ryan Sweeney, Portage, MI (US); Madhu Sandeep Thota, Portage, MI (US)

(73) Assignee: Stryker Corporation, Portage, MI (US)

( * ) Notice: Subject to any disclaimer, the term of this patent is extended or adjusted under 35 U.S.C. 154(b) by 227 days.

(21) Appl. No.: 18/140,728

(22) Filed: Apr. 28, 2023

(65) Prior Publication Data

US 2023/0346615 A1 Nov. 2, 2023

Related U.S. Application Data

(60) Provisional application No. 63/335,863, filed on Apr. 28, 2022.

(51) Int. Cl.
*A61G 7/05* (2006.01)

(52) U.S. Cl.
CPC .......... *A61G 7/0524* (2016.11); *A61G 7/0526* (2013.01)

(58) Field of Classification Search
CPC .......... A61G 7/00; A61G 7/05; A61G 7/0524; A61G 7/0526; A61G 7/1032;
(Continued)

(56) References Cited

U.S. PATENT DOCUMENTS 3,612,509 A * 10/1971 Boston ................. A61G 7/1098 269/98
4,633,237 A * 12/1986 Tucknott ............... A61B 5/1117 600/595

(Continued)

FOREIGN PATENT DOCUMENTS

| | | | |
|---|---|---|---|
| JP | 5111889 | B2 | 1/2013 |
| WO | 2021108377 | A1 | 6/2021 |

(Continued)

OTHER PUBLICATIONS

English language abstract and machine-assisted English translation for JP 5111889 B2 extracted from espacenet.com database on Apr. 30, 2023, 10 pages.

*Primary Examiner* — Van T Trieu
(74) *Attorney, Agent, or Firm* — Howard & Howard Attorneys PLLC

(57) ABSTRACT

A patient support apparatus for use in treating patients with behavioral health indicia. The patient support apparatus includes a support structure with a patient support deck defining a patient support surface having one or more ligature risk locations arranged outside of a ligature safety zone defined relative to the patient support surface. A sensor system is coupled to the support structure to generate data representing load acting on the support structure. A controller is disposed in communication with the sensor system and is configured to issue a ligature risk event alert in response to the data generated by the sensor system satisfying a predetermined load criteria indicating a distribution of load acting on the support structure outside of the ligature safety zone for a predetermined period.

20 Claims, 21 Drawing Sheets

(58) Field of Classification Search
CPC ...... A61G 7/1098; A61G 10/00; A61G 13/00; A61G 13/0009; A61B 5/1117
See application file for complete search history.

(56) References Cited

U.S. PATENT DOCUMENTS

| | | | |
|---|---|---|---|
| 7,253,366 | B2 | 8/2007 | Bhai |
| 7,834,768 | B2 | 11/2010 | Dixon et al. |
| 9,009,893 | B2 | 4/2015 | Kramer et al. |
| 9,539,156 | B2 | 1/2017 | Lemire et al. |
| 9,655,796 | B2 | 5/2017 | Riley et al. |
| 9,987,182 | B2 | 6/2018 | Emire et al. |
| 10,172,753 | B2 | 1/2019 | Tessmer et al. |
| 10,617,327 | B2 | 4/2020 | Kostic et al. |
| 10,786,408 | B2 | 9/2020 | Sidhu |
| 10,806,653 | B2 | 10/2020 | Upchurch et al. |
| 10,922,936 | B2 | 2/2021 | Kusens et al. |
| 11,033,233 | B2 | 6/2021 | Hayes et al. |
| 11,490,834 | B2 | 11/2022 | Sukumaran et al. |
| 2001/0032362 | A1 * | 10/2001 | Welling ............... A61G 7/0755 5/600 |
| 2019/0060823 | A1 | 2/2019 | Kolesnikov et al. |
| 2021/0030611 | A1 | 2/2021 | Shiery et al. |
| 2021/0052197 | A1 | 2/2021 | Sukumaran et al. |
| 2021/0338504 | A1 | 11/2021 | Childs et al. |

FOREIGN PATENT DOCUMENTS

| | | | |
|---|---|---|---|
| WO | 2021138176 | A1 | 7/2021 |
| WO | 2021242946 | A1 | 12/2021 |
| WO | 2022251199 | A1 | 12/2022 |
| WO | 2023064182 | A1 | 4/2023 |

* cited by examiner

PATIENT SUPPORT APPARATUS FOR TREATING PATIENTS PRESENTING BEHAVIORAL HEALTH INDICIA

CROSS-REFERENCE TO RELATED APPLICATION

The subject patent application claims priority to and all the benefits of U.S. Provisional Patent Application No. 63/335,863 filed on Apr. 28, 2022, the disclosure of which is hereby incorporated by reference in its entirety.

BACKGROUND

Patient support apparatuses, such as hospital beds, stretchers, cots, tables, wheelchairs, and chairs are used to help caregivers facilitate care of patients in a health care setting. Conventional patient support apparatuses generally comprise a base and a patient support surface upon which the patient is supported. Often, these patient support apparatuses have one or more movable components, such as side rails that can be moved between raised and lowered positions, deck sections which articulate to adjust the patient support surface to support the patient between different patient support configurations, as well as lift mechanisms that adjust the height of the patient support surface.

In some environments, certain patients may present various forms of behavioral health indicia which can be associated with a potential risk of self-harm. Depending on the specific configuration of the patient support apparatus, some patients may sometimes attempt to inflict harm on themselves, or others, using the patient support apparatus or components thereof. In these types of scenarios, caregivers are sometimes assigned to the patient's room and may visually monitor the patient continuously in order to, among other things, help prevent the occurrence of patient self-harm. Here too, the presence of the caregiver can also help to discourage the patient from tampering with the patient support apparatus or other medical devices. In this way, caregivers are generally able to promptly address patient behavior that could otherwise lead to self-harm in an absence of continuous monitoring.

There remains a need in the art to address one or more of the challenges outlined above.

SUMMARY

The present disclosure provides a patient support apparatus for use in treating patients with behavioral health indicia. A support structure with a patient support deck defining a patient support surface includes one or more ligature risk locations arranged outside of a ligature safety zone defined relative to the patient support surface; a sensor system coupled to the support structure to generate data representing load acting on the support structure; and a controller disposed in communication with the sensor system and configured to issue a ligature risk event alert in response to the data generated by the sensor system satisfying a predetermined load criteria indicating a distribution of load acting on the support structure outside of the ligature safety zone for a predetermined period.

The present disclosure also provides a patient support apparatus for use in treating patients with behavioral health indicia. The patient support apparatus includes: a support structure including a patient support deck defining a patient support surface, the support structure including one or more ligature risk locations arranged within one or more ligature risk zones defined relative to the patient support surface; a sensor system coupled to the support structure to generate data representing load acting on the support structure; and a controller disposed in communication with the sensor system and configured to issue a ligature risk event alert in response to the data generated by the sensor system satisfying a predetermined load criteria indicating a distribution of load acting on the support structure within the one or more ligature risk zones for a predetermined period.

The present disclosure also provides a patient support apparatus for use in treating patients presenting behavioral health symptoms, where the patient support apparatus includes: a support structure including a patient support deck defining a patient support surface; a mount operatively attached to the support structure and supporting a barrier to at least partially limit egress across a periphery of the patient support surface; a sensor system coupled to the support structure to generate data representing load acting on the support structure; and a controller adapted to issue a ligature risk event alert in response to changes occurring in the data generated by the sensor system indicating a distribution of load acting on the support structure concentrated adjacent to the mount according to a predetermined load concentration criteria.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
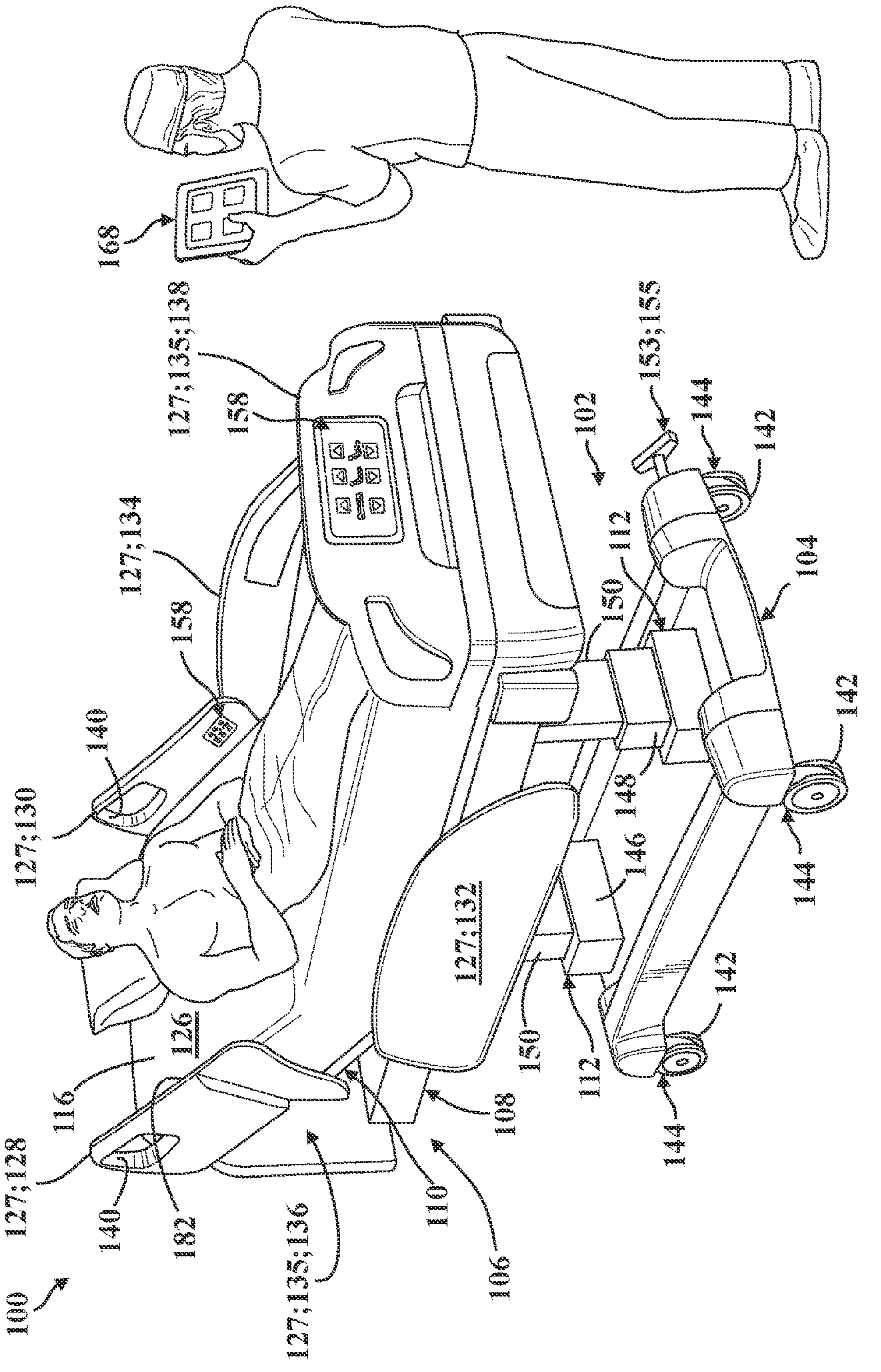
FIG. 1 is perspective view of a patient support apparatus having a base, a litter with a patient support deck, a lift mechanism, and side rails.

Referring to FIGS. 1 and 3A-6, a patient support apparatus 100 is shown for supporting a patient in a health care setting. The patient support apparatus 100 illustrated throughout the drawings is realized as a hospital bed. In other versions, however, the patient support apparatus 100 may be a stretcher, a cot, a table, a wheelchair, a chair, or a similar apparatus utilized in the care of a patient.

A support structure 102 provides support for the patient. In the representative version illustrated herein, the support structure 102 generally comprises a base 104 and a litter 106. Here, the litter 106 includes an intermediate frame 108 and a patient support deck 110 spaced above the base 104. As is described in greater detail below, a lift mechanism 112 is interposed between the base 104 and the intermediate frame 108 to facilitate moving the litter 106 relative to the base 104 between a plurality of vertical configurations, including without limitation one or more raised configurations 106A (see FIGS. 3A-4A), lowered configurations 106B (see FIGS. 4B-5), and/or inclined configurations 106C (see FIG. 6) such as a Trendelenburg configuration (not shown).

The patient support deck 110 has at least one deck section 114 arranged for movement relative to the intermediate frame 108 between a plurality of section positions 114A, 114B. The deck sections 114 of the patient support deck 110 provide a patient support surface 116 upon which the patient is supported. More specifically, in the representative version of the patient support apparatus 100 illustrated herein, the patient support deck 110 has four deck sections 114 which cooperate to define the patient support surface 116: a back section 118, a seat section 120, a leg section 122, and a foot section 124 (see FIGS. 3A-6). In the representative version illustrated herein, the seat section 120 is fixed to the intermediate frame 108 and is not arranged for movement relative thereto. However, it will be appreciated that the seat section 120 could be movable relative to other deck sections 114 in some versions. Conversely, the back section 118 and the leg section 122 are arranged for independent movement relative to each other and to the intermediate frame 108, as described in greater detail below, and the foot section 124 is arranged to move partially concurrently with the leg section 122. Other configurations are contemplated, and it will be appreciated that different arrangements of deck sections 114 are contemplated by the present disclosure. By way of non-limiting example, the patient support deck 110 could be configured without a discrete seat section 120 in some versions. Furthermore, while the representative version of the litter 106 illustrated herein employs the intermediate frame 108 to support the deck sections 114 of the patient support deck 110 for movement relative to the base 104 via the lift mechanism 112, it will be appreciated that various types of litters 106, with or without discrete intermediate frames 108 and/or with a differently-configured lift mechanism 112, are contemplated by the present disclosure.

A mattress 126 is disposed on the patient support deck 110 during use. The mattress 126 comprises or otherwise defines the patient support surface 116 upon which the patient is supported, but it will be appreciated that its shape is defined based on the arrangement of the patient support deck 110. Here too, it will be appreciated that the patient support deck 110 itself would define the patient support surface 116 during operation of some versions of the patient support apparatus 100 without the mattress 126. Put differently, the mattress 126 may be omitted in certain versions, such that the patient can rest directly on the patient support surface 116 defined by the deck sections 114 of the patient support deck 110. The base 104, the litter 106, the intermediate frame 108, and the patient support deck 110 each have a head end and a foot end corresponding to designated placement of the patient's head and feet on the patient support apparatus 100. It will be appreciated that the specific configuration of the support structure 102 may take on any known or conventional design, and is not limited to that specifically illustrated and described herein. Other configurations are contemplated.

Figure 3A:
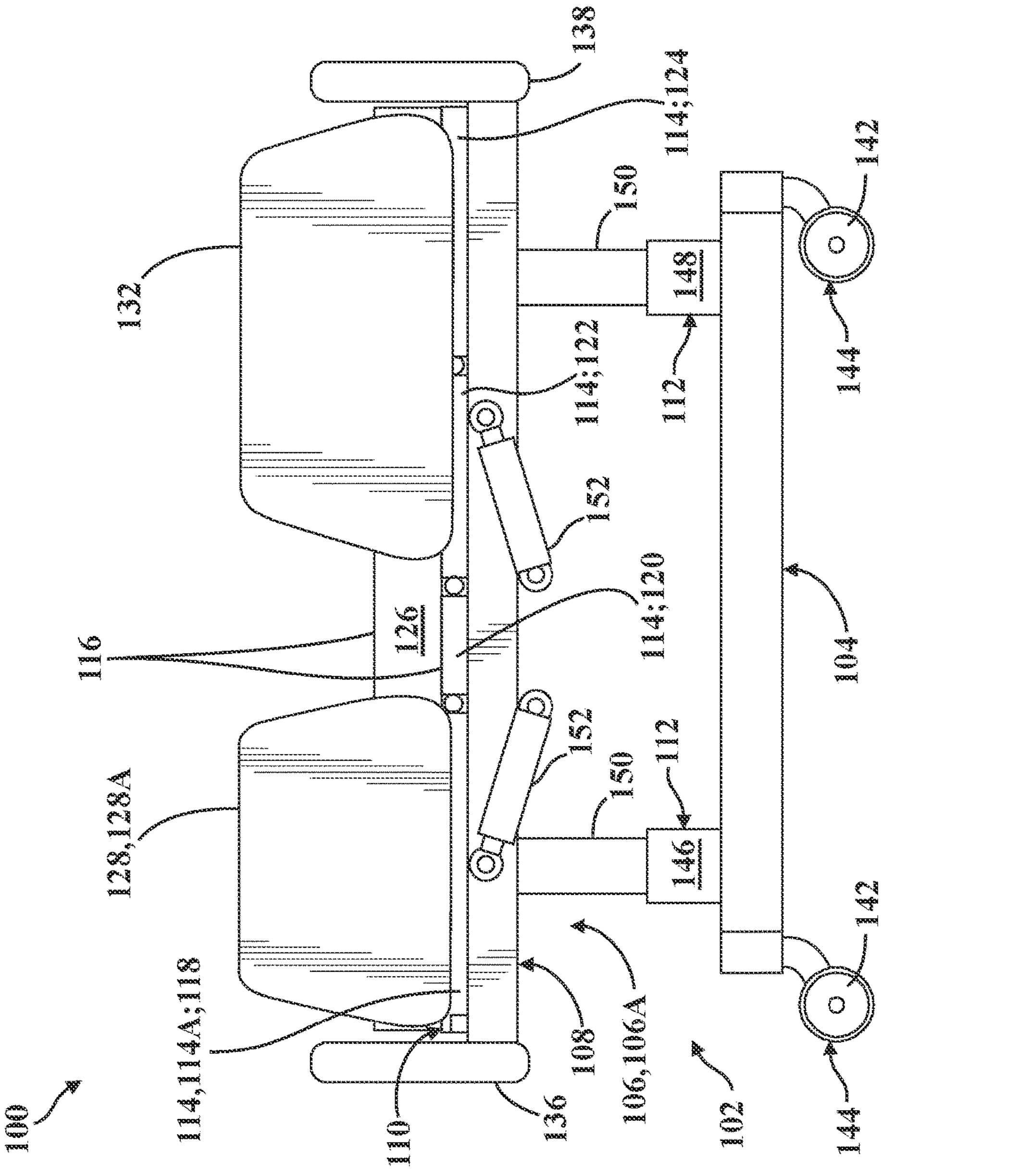
FIG. 3A is a schematic right-side view of the patient support apparatus of FIG. 1, shown with each of the side rails arranged in a raised position.
Figure 3B:
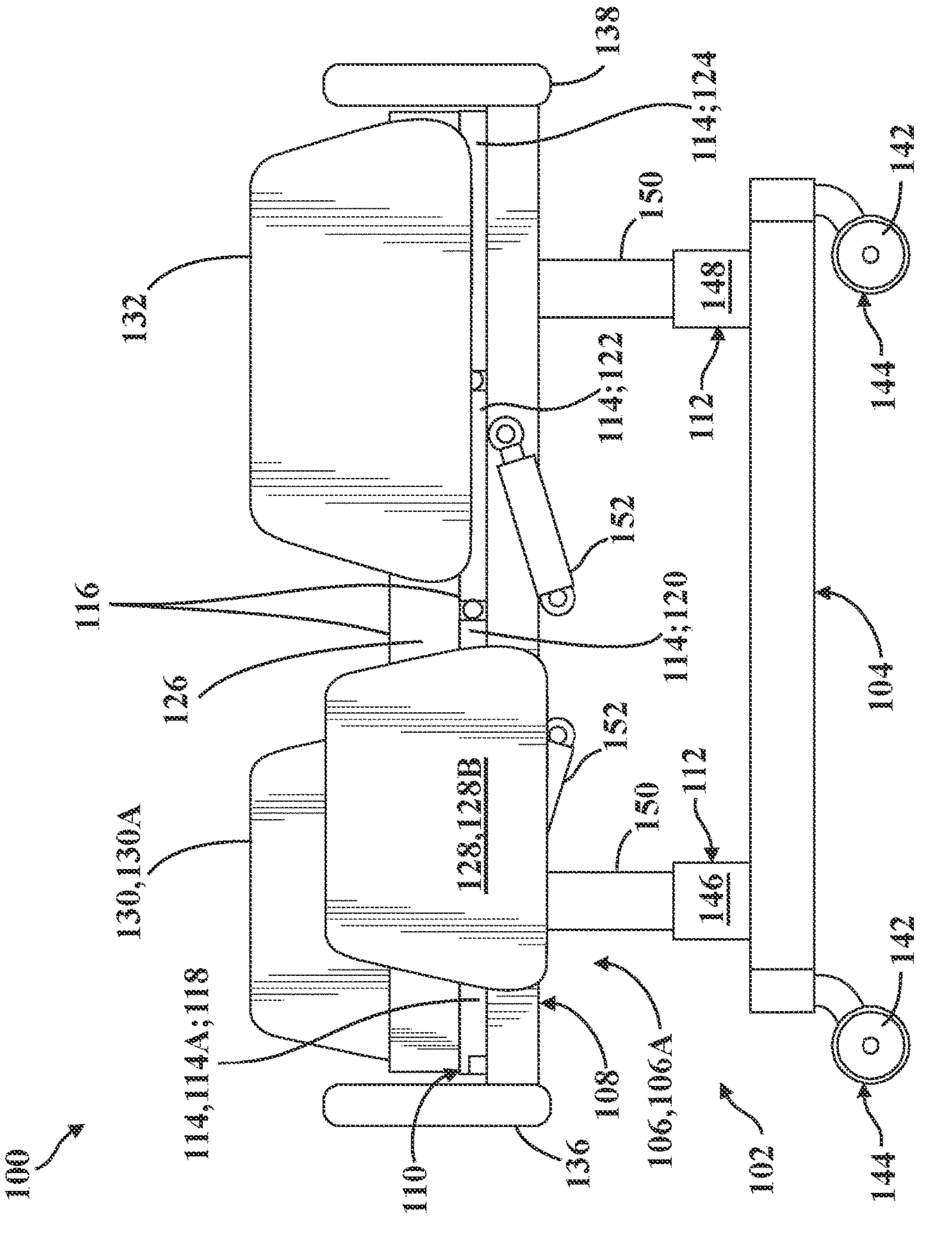
FIG. 3B is another schematic right-side view of the patient support apparatus of FIG. 3A, shown with a first side rail arranged in an intermediate position, and shown with a second side rail arranged in the raised position.
Figure 3C:
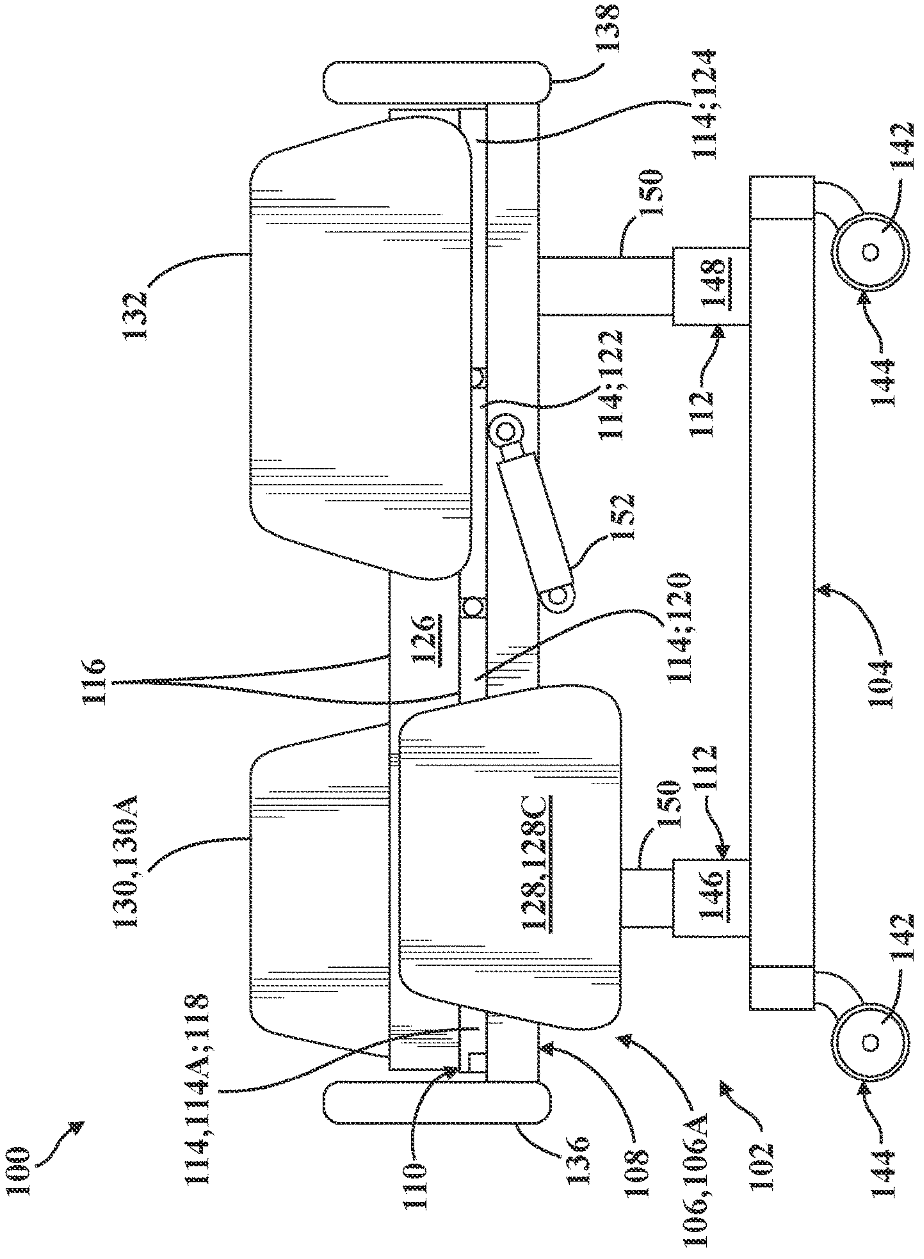
FIG. 3C is another schematic right-side view of the patient support apparatus of FIGS. 3A-3B, shown with the first side rail arranged in a lowered position.

In the illustrated versions, and as is described in greater detail below in connection with FIGS. 7A-7B, the patient support apparatus 100 includes mounts 125 operatively attached to the support structure 102 to, among other things, support certain components or serve as attachment points for accessory devices as described in greater below. Here, for example, barriers 127 may be coupled to one or mounts 125 to at least partially limit egress across a periphery P of the patient support surface 116. In some versions, barriers 127 may be realized as side rails 128, 130, 132, 134, and/or as end boards 135 such as headboards 136 and/or footboards 138. Other configurations are contemplated The Side rails 128, 130, 132, 134 are coupled to the support structure 102 via mounts 125 and are supported for movement relative to the intermediate frame 108 (and, thus, relative to the base 104). A first side rail 128 is positioned at a right head end of the litter 106. A second side rail 130 is positioned at a left head end of litter 106. A third side rail 132 is positioned at a right foot end of the litter 106. A fourth side rail 134 is positioned at a left foot end of the litter 106. As shown in FIGS. 3A-3C, one or more of the side rails may be coupled to one or mounts 125 via linkages 139, and may be movable between a plurality of side rail positions, including a raised position 128A, 130A in which they block ingress and egress into and out of the patient support apparatus 100 (see FIG. 3A), one or more intermediate positions 128B, 130B (see FIG. 3B), and a lowered position 128C, 130C (see FIG. 3C) in which they are not an obstacle to such ingress and egress across the periphery P of the patient support surface 116. It will be appreciated that there may be fewer side rails for certain versions, such as where the patient support apparatus 100 is realized as a stretcher or a cot. Similarly, it will be appreciated that side rails may be attached to any suitable component or structure of the patient support apparatus 100, and that their respective mount 125 and/or linkage 139 may be configured in various ways. In some versions, the side rails 128, 130, 132, 134 or other portions of the patient support apparatus 100 may be similar to as is described in U.S. Patent Application Publication No. US 2021/0338504 A1, entitled "Side Rail Assembly For A Patient Support Apparatus," the disclosure of which is hereby incorporated by reference in its entirety. Other configurations are contemplated. In the representative version illustrated herein, the first and second side rails 128, 130 are coupled to the back section 118 of the patient support deck 110 and move concurrently therewith (connection not shown in detail; see FIGS. 7A-7B). In FIGS. 4A-6, which each depict right-side views of the patient support apparatus 100, the first and third side rails 128, 132 are omitted for illustrative purposes.

As shown in FIGS. 1 and 3A-6, a headboard 136 and a footboard 138 are coupled to respective mounts 125 of the intermediate frame 108 of the litter 106. However, it will be appreciated that the headboard 136 and/or footboard 138 may be coupled to other locations on the patient support apparatus 100, such as the base 104, or may be omitted in certain versions. One or more caregiver interfaces 140, such as handles, are shown in FIG. 1 as being integrated into the first and second side rails 128, 130 to facilitate movement of the patient support apparatus 100 over floor surfaces. Additional caregiver interfaces 140 may be integrated into the headboard 136, the footboard 138, and/or other components of the patient support apparatus 100, such as the third and/or fourth side rails 132, 134, the intermediate frame 108, and the like. The caregiver interfaces 140 are shaped so as to be grasped by a caregiver as a way to position or otherwise manipulate the patient support apparatus 100 for movement. It will be appreciated that the caregiver interfaces 140 could be integrated with or operatively attached to any suitable portion of the patient support apparatus 100, or may be omitted in certain versions.

Wheels 142 are coupled to the base 104 to facilitate transportation over floor surfaces. The wheels 142 are arranged in each of four quadrants of the base 104, adjacent to corners of the base 104. In the version shown in FIG. 1, the wheels 142 are caster wheels that are able to rotate and swivel relative to the support structure 102 during transport. Here, each of the wheels 142 forms part of a caster assembly 144 mounted to the base 104. In the illustrated version, the patient support apparatus 100 includes a brake assembly 153 operatively attached to one or more of the wheels 142 and being operable between a braked state 153B to inhibit movement of the base 104 about floor surfaces, and an unbraked state 153U to permit movement of the base 104 about floor surfaces. In some versions, the brake assembly 153 includes a brake lever 155 (e.g., a foot pedal) operatively attached to the base 104 and arranged for user engagement to operate the brake assembly 153 between the braked state 153B and the unbraked state 153U. In some versions, the brake assembly 153 may be similar to as is disclosed in U.S. Pat. No. 10,806,653, entitled "Patient Transport Apparatus With Electro-Mechanical Braking System," and/or International Patent Application Publication No. WO 2021/138176 A1, entitled "Patient Transport Apparatus With Electro-Mechanical Braking System," the disclosures of each of which are hereby incorporated by reference in their entirety. Other configurations are contemplated.

It should be understood that various configurations of the caster assemblies 144 are contemplated. In addition, in some versions, the wheels 142 are not caster wheels. Moreover, it will be appreciated that the wheels 142 may be non-steerable, steerable, non-powered, powered, or combinations thereof. While the representative version of the patient support apparatus 100 illustrated herein employs four wheels 142, additional wheels are also contemplated. For example, the patient support apparatus 100 may comprise four non-powered, non-steerable wheels, along with one or more additional powered wheels. In some cases, the patient support apparatus may not include any wheels. In other versions, one or more auxiliary wheels (powered or non-powered), which are movable between stowed positions and deployed positions, may be coupled to the support structure 102. In some cases, when auxiliary wheels are located between caster assemblies 144 and contact the floor surface in the deployed position, they cause two of the caster assemblies 144 to be lifted off the floor surface, thereby shortening a wheel base of the patient support apparatus 100. A fifth wheel may also be arranged substantially in a center of the base 104.

Figure 4A:
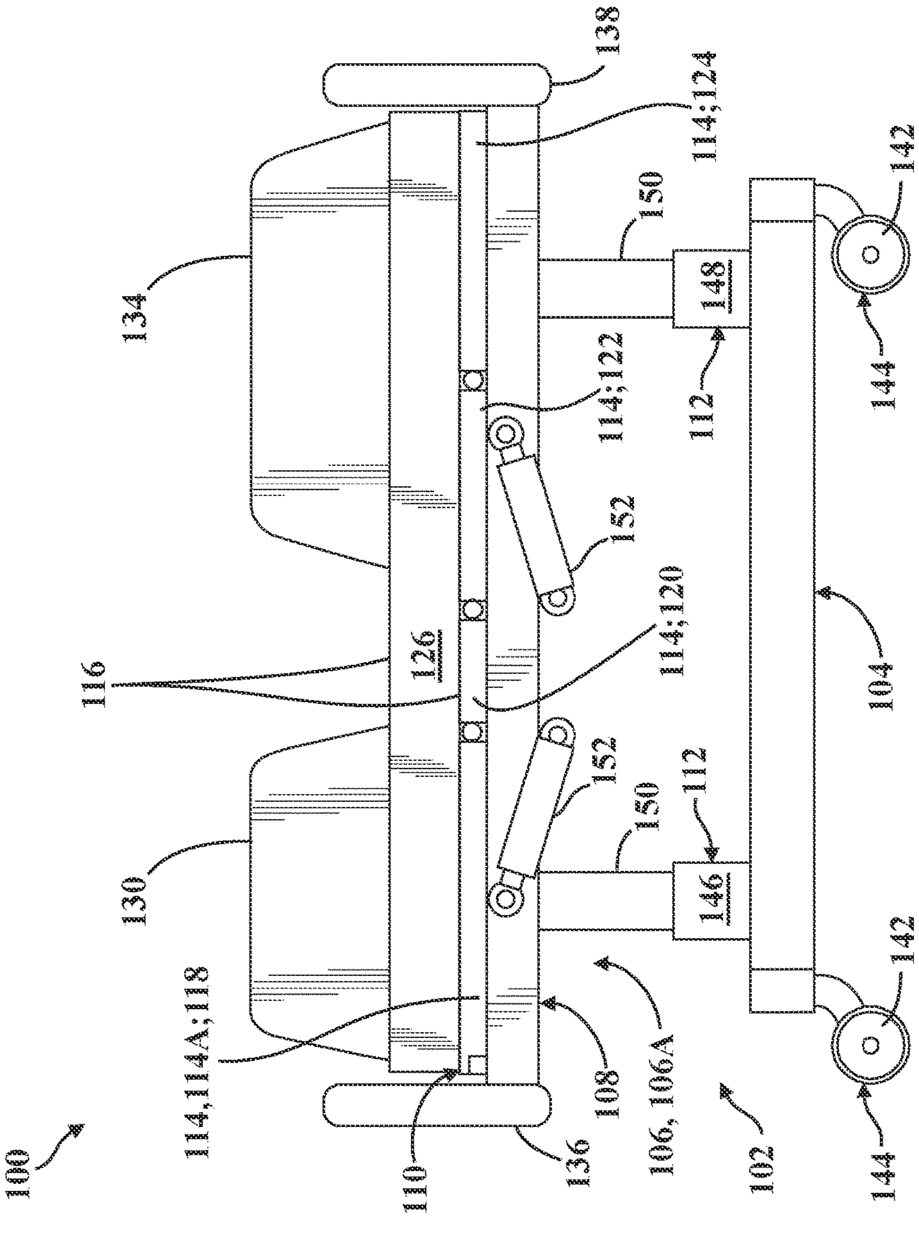
FIG. 4A is another schematic right-side view of the patient support apparatus of FIGS. 3A-3C, shown with two of the side rails removed for illustrative purpose, and with the lift mechanism supporting the litter in a raised configuration.
Figure 4B:
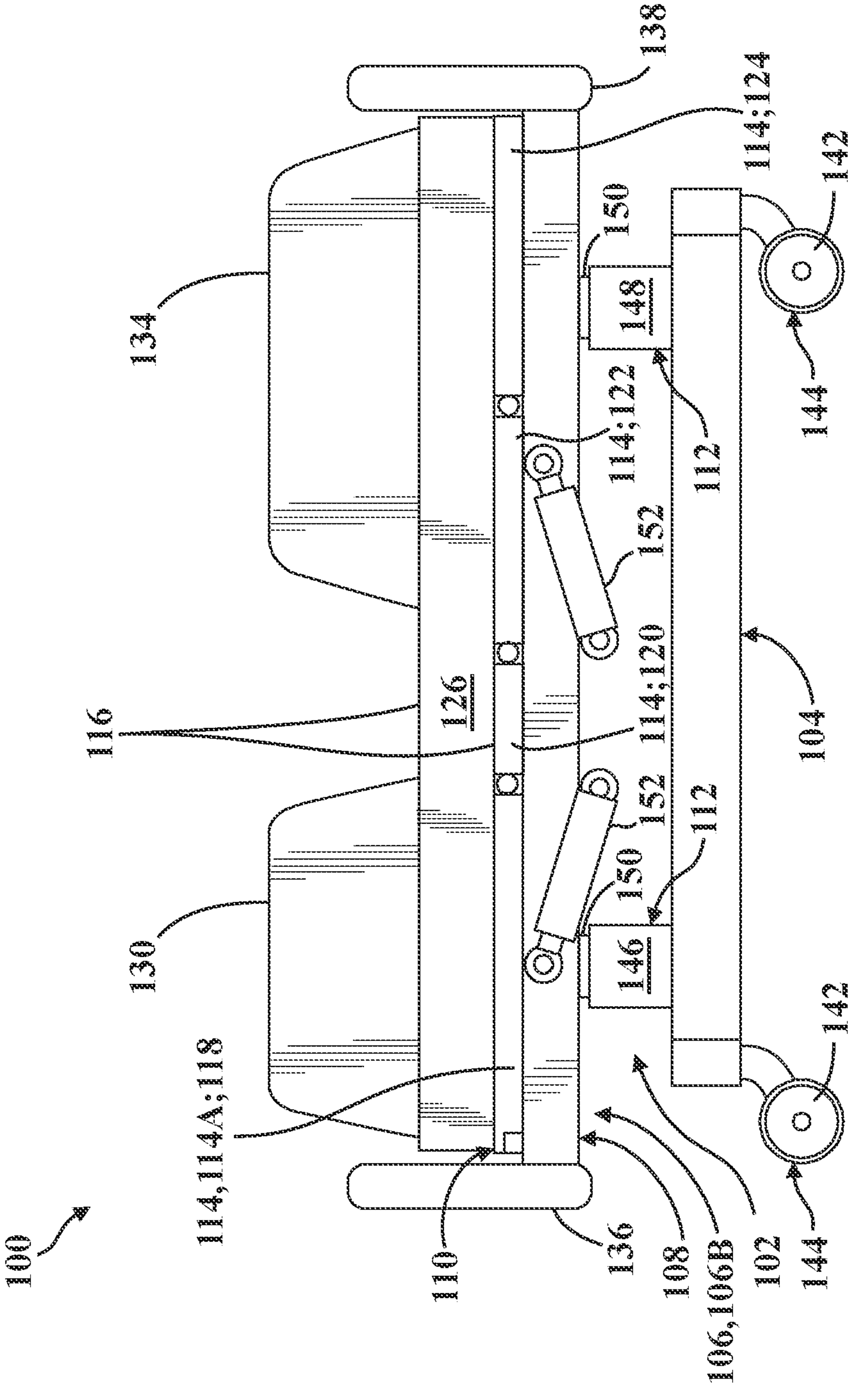
FIG. 4B is another schematic right-side view of the patient support apparatus of FIG. 4A, shown with the lift mechanism supporting the litter in a lowered configuration.
Figure 5:
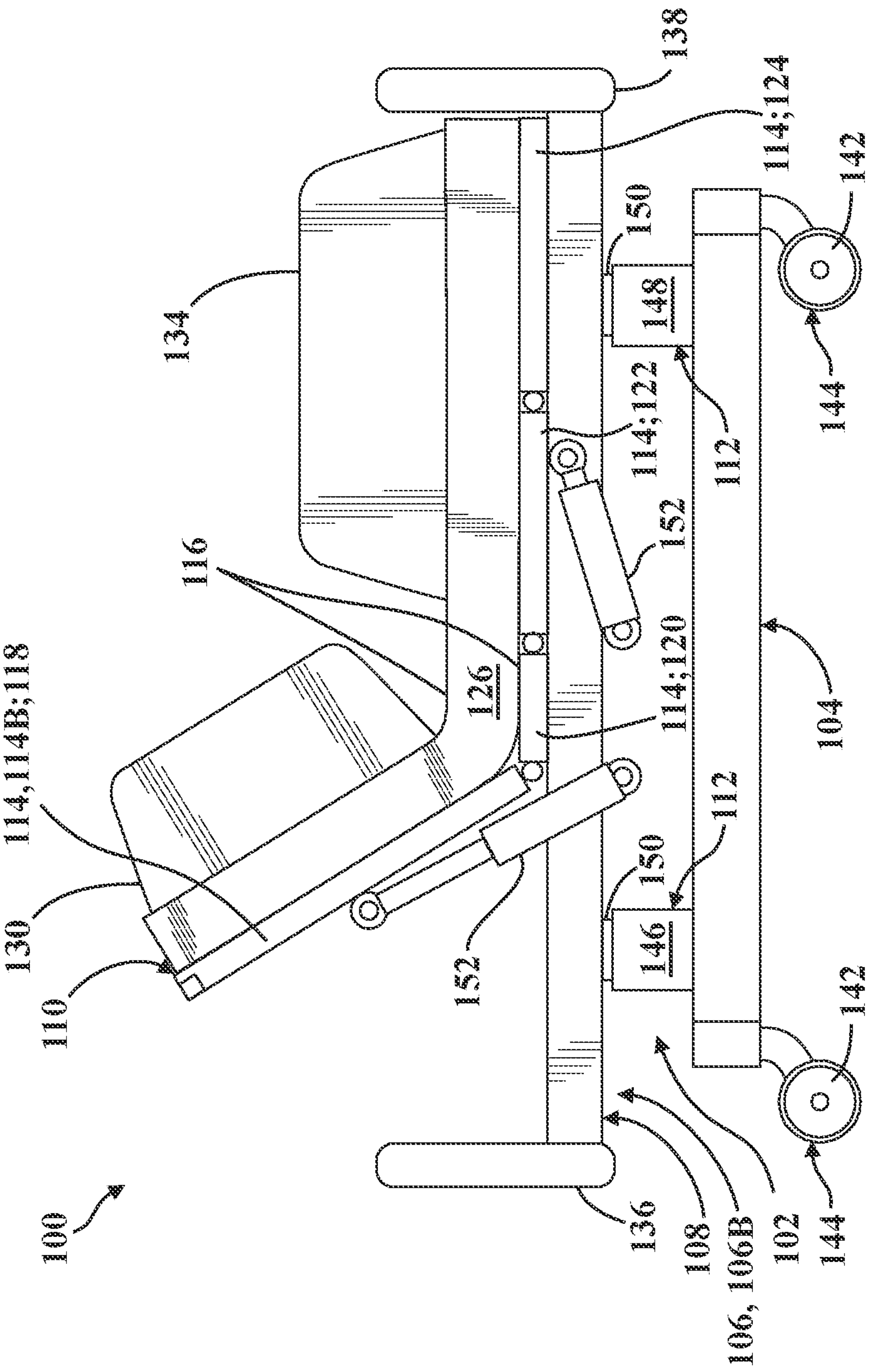
FIG. 5 is another schematic right-side view of the patient support apparatus of FIG. 4B, shown with the patient support deck having a back section arranged in a fowler's position with the second side rail coupled to the back section.
Figure 6:
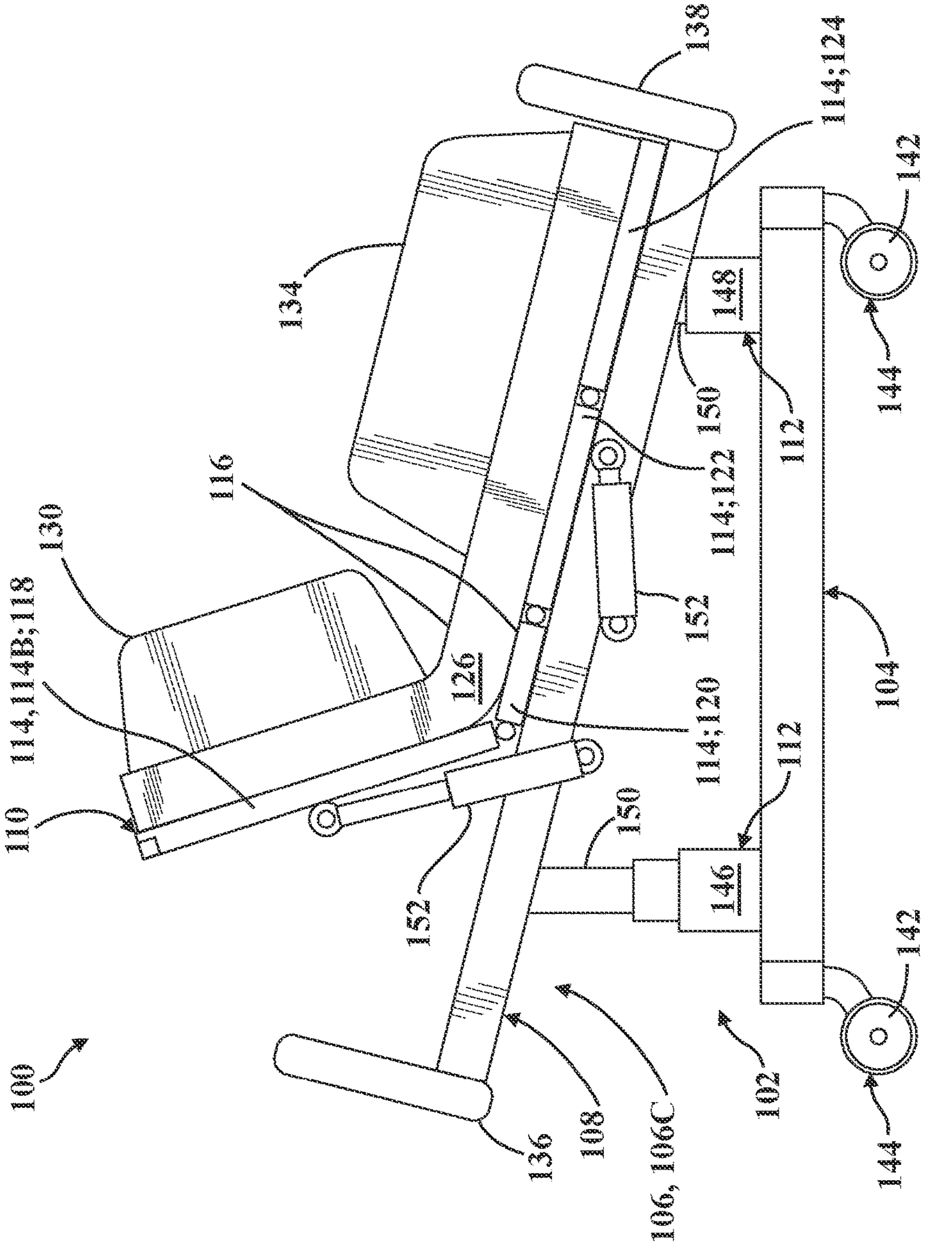
FIG. 6 is another schematic right-side view of the patient support apparatus of FIG. 5, shown with the lift mechanism supporting the litter in an inclined configuration.

As noted above, the patient support apparatus 100 employs the lift mechanism 112 to lift and lower the litter 106 relative to the base 104 which, in turn, moves the intermediate frame 108 together with the patient support deck 110 between various vertical configurations, such as to the raised vertical configuration 106A depicted in FIGS. 3A-4A, the lowered vertical configuration 106B depicted in FIGS. 4B-5, or to any desired vertical configuration therebetween including various inclined configurations 106A such as is depicted in FIG. 6. To this end, the lift mechanism 112 may include a head end lift member 146 and a foot end lift member 148 which are each arranged to facilitate movement of the litter 106 with respect to the base 104 using one or more lift actuators 150. The lift actuators 150 may be realized as linear actuators, rotary actuators, or other types of actuators, and may be electrically operated and/or may be hydraulic. It is contemplated that, in some configurations, only one lift member and one associated lift actuator may be employed, e.g., to raise only one end of the litter 106 (see FIG. 6), or one central lift actuator to raise and lower the litter 106. The construction of the lift mechanism 112, the head end lift member 146, and/or the foot end lift member 148 may take on any known or conventional design, and is not limited to that specifically illustrated. By way of non-limiting example, the lift mechanism 112 could comprise a "scissor" linkage arranged between the base 104 and the litter 106 with one or more actuators configured to facilitate vertical movement of the patient support deck 110. In some versions, the lift mechanism 112 may be similar to as is described in U.S. Pat. No. 10,172,753, entitled "Patient Support Lift Assembly," the disclosure of which is hereby incorporated by reference in its entirety. Other configurations are contemplated.

As noted above, the patient support deck 110 is operatively attached to the intermediate frame 108 (e.g., as depicted in FIGS. 1 and 3A-6), with one or more of the deck sections 114 arranged for movement between a first section position 114A (see FIGS. 3A-4B) and a second section position 114B (see FIGS. 5-6). To this end, one or more deck actuators 152 are interposed between the deck section 114 and the intermediate frame 108 to move the deck section 114. In the representative versions illustrated herein, the deck actuator 152 is realized as a linear actuator disposed in force-translating relationship between the deck section 114 and the intermediate frame 108. More specifically, one deck actuator 152 is provided between the intermediate frame 108 and the back section 118, and another deck actuator 152 is provided between the intermediate frame 108 and the leg section 122, and each of the deck actuators 152 is arranged for independent movement to position the respective deck sections 114 to adjust the shape of the patient support surface 116 between a plurality of patient support configurations (for example, a flat configuration, a raised fowler configuration, a seated configuration, etc.). Here, the deck actuator 152 coupled to the back section 118 is configured to move the back section 118 between the first section position 114A (see FIGS. 3A-4B), the second section position 114B (see FIGS. 5-6), as well as to additional section positions between the first and second section positions 114A, 114B and/or to section positions beyond the second section position 114B.

Those having ordinary skill in the art will appreciate that the patient support apparatus 100 could employ any suitable number of deck actuators 152, of any suitable type or configuration sufficient to effect selective movement of one or more of the deck sections 114 relative to the litter 106 or other components of the support structure 102. By way of non-limiting example, the deck actuator 152 could be a linear actuator or one or more rotary actuators driven electronically and/or hydraulically, and/or controlled or driven in any suitable way. Moreover, the deck actuator 152 could be mounted, secured, coupled, or otherwise operatively attached to the intermediate frame 108 and to the deck section 114, either directly or indirectly, in any suitable way. In addition, one or more of the deck actuators 152 could be omitted for certain applications.

Referring now to FIGS. 1-6, the patient support apparatus 100 employs a control system, generally indicated at 154, to effect operation of various functions of the patient support apparatus 100, as described in greater detail below. To this end, and as is best shown schematically in FIG. 2, the control system 154 generally includes a controller 156 disposed in communication with one or more user interfaces 158 adapted for use by the patient and/or the caregiver to facilitate operation of one or more functions of the patient support apparatus 100. In certain versions, the controller 156 is also disposed in communication with the lift actuators 150, the deck actuators 152, a sensor system 160, one or more local alarms 162, one or more remote alarms 164, a communication interface 166 for communicating with a remote device 168 across a network 170, and/or one or more sensors 172. Each of these components will be described in greater detail below.

Figure 2:
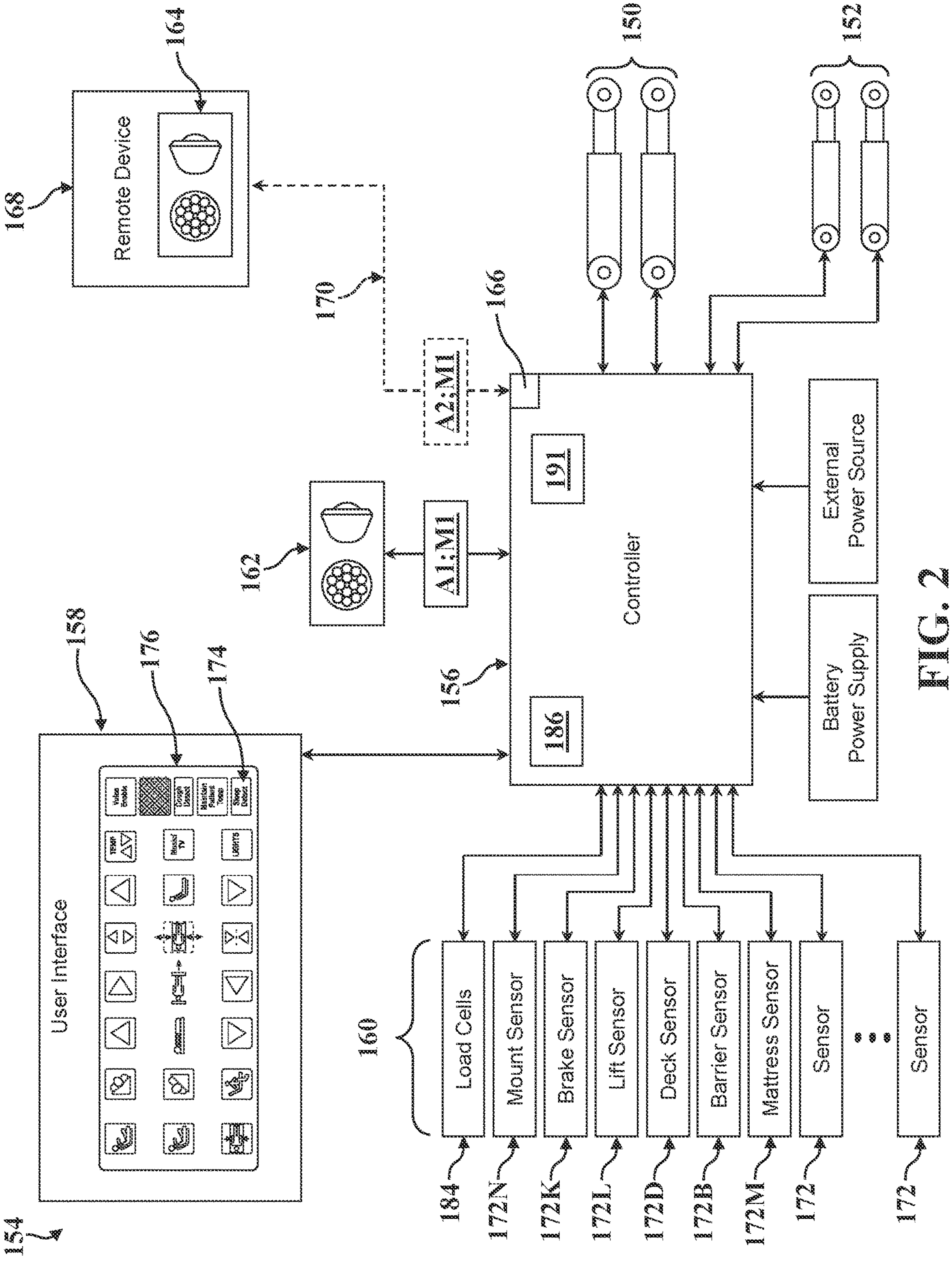
FIG. 2 is an illustrative view of a control system of the patient support apparatus of FIG. 1.

As noted above, the controller 156 is best depicted schematically FIG. 2, and has been omitted from certain drawings for the purposes of clarity and consistency. It will be appreciated that the controller 156 and/or the control system 154 can be configured or otherwise arranged in a number of different ways. The controller 156 may have one or more microprocessors for processing instructions or for processing an algorithm stored in memory to control operation of the actuators 150, 152, generation or interpretation of signals and/or data (e.g., data from sensors 172, the sensor system 160, and the like), communication with the user interfaces 158 and/or remote devices 168, and the like. Additionally or alternatively, the controller 156 may comprise one or more microcontrollers, field programmable gate arrays, systems on a chip, discrete circuitry, and/or other suitable hardware, software, or firmware that is capable of carrying out the various functions and operations described herein. The controller 156 may be carried on-board the patient support apparatus 100, such as on the base 104 or the litter 106, or may be remotely located. The controller 156 may comprise one or more subcontrollers configured to control all of the actuators 150, 152 and/or user interfaces 158 or one or more subcontrollers for each actuator 150, 152 and/or user interface 158 (or other component of the patient support apparatus 100). The controller 156 may communicate with the actuators 150, 152, the user interfaces 158, and or other components of the control system 154 via wired or wireless connections.

In the representative version illustrated in FIG. 1, the patient support apparatus 100 comprises a plurality of user interfaces 158 which may be accessible by the patient, the caregiver, or by both the caregiver and the patient. Each user interface 158 of the patient support apparatus 100 generally comprises an input device 174 configured to generate an input signal in response to activation by a user which, in turn, is communicated to the controller 156. The controller 156, in turn, is responsive to the input signal and can control or otherwise carry out one or more functions of the patient support apparatus 100 in response to receiving the input signal. Put differently, the controller 156 is configured to perform a function of the patient support apparatus 100 in response to receiving the input from the input device 174. By way of non-limiting example, the input device 174 could be realized as a "lift bed" button, activation of which causes the controller 156 to drive the lift actuators 150 to move the intermediate frame 108 of the litter 106 from the maximum lowered configuration 106B (see FIG. 4B) vertically away from the base 104 towards the raised configuration 106A (see FIG. 4A). In some versions, one or more of the user interfaces 158 may also employ an output device 176, such as a screen, one or more audible and/or visual indicators (e.g., speakers, beepers, light emitting diodes LEDs, and the like), to communicate information to the user (e.g., to the caregiver). In some versions, the user interface 158 may be realized as a touchscreen interface that serves as both an input device 174 and an output device 176. In some versions, the controller 156 may be configured to facilitate navigation of visual content of the user interface 158 (e.g., realized as a graphical user interface GUI) in response to receiving the input signal from the input device 174. Thus, it will be appreciated that the user interface 158 could be configured in a number of different ways sufficient to generate the input signal. Moreover, it will be appreciated that the user interfaces 158 could be of a number of different styles, shapes, configurations, and the like. By way of non-limiting example, one or more of the user interfaces 158 may comprise buttons, indicators, screens, graphical user interfaces, and the like. Other configurations are contemplated.

Referring now, generally, to FIGS. 1-13C, as noted above, the patient support apparatus 100 described and illustrated herein is configured for use in treating patients with or otherwise presenting behavioral health indicia such as, for example, those associated with an increased risk of a potential for self-harm. In particular, unsupervised patients presenting severe, suicidal behavioral health indicia may sometimes attempt to pass unauthorized objects (e.g., sheets, cords, cables, and the like) through and/or around certain portions of the patient support apparatus 100 defined as ligature risk locations 178 (e.g., mounts 125 of the support structure 102 and/or other portions of the patient support apparatus 100; see FIGS. 7A and 9) in an attempt to inflict self-harm. In order to help ensure patient safety in these and other scenarios, the patient support apparatus 100 of the present disclosure employs the sensor system 160 to, among other things, generate data D representing load acting on the support structure 102, which is evaluated, by a perimeter load detection system 161 (e.g., a part of the controller 156; see FIG. 2), relative to one or more ligature risk locations 178 arranged outside of a ligature safety zone 180 defined relative to the patient support surface 116 (and/or inside of a ligature risk zone 182 defined such as adjacent to a mount 125; see FIG. 12) as described in greater detail below. Here, the controller 156 is configured to issue a ligature risk event alert A1 in response to the data D generated by the sensor system 160 satisfying a predetermined load criteria LC indicating a distribution of load acting on the support structure 102 outside of the ligature safety zone 180 (and/or inside of the ligature risk zone 182) persisting for a predetermined period P1. In this way, and as is described in greater detail below, the generation of the ligature risk event alert A1 via the perimeter load detection system 161 allows the caregiver or others nearby to be alerted to the patient's actions quickly and predictably and intervene to help ensure patient safety.

As will be appreciated from the subsequent description below, the perimeter load detection system 161 may be formed integrally with the controller 156, and/or may be realized as a separate portion of the patient support apparatus 100 (e.g., as a sub-controller). In some versions, the perimeter load detection system 161 monitors data D from the sensor system 160 and/or other sensors 172, and communicates ligature risk event alerts A1 to the controller 156 which, in turn, may activate one or more alarms. However, other configurations are contemplated, and the perimeter load detection system 161 may not be realized with separate components, such as where the perimeter load detection system 161 is realized as code stored in memory and executed by one or more processors of the controller 156 or other portions of the control system 154. Here in this exemplary configuration, the controller 156 communicates with the sensor system 160 and issues alerts and, thus, defines the perimeter load detection system 161. Accordingly, the terms "perimeter load detection system 161" and "controller 156" may be utilized interchangeably herein unless otherwise noted. In some versions, the perimeter load detection system 161 may be activated (e.g., "armed") by the caregiver or another user via the user interface 158. However, other configurations are contemplated, and in some versions the perimeter load detection system 161 may be activated by default and could be selectively deactivated via the user interface 158 and/or by changes in signals generated by various sensors 172 as described in greater detail below.

As noted above, in some versions, the patient support apparatus 100 employs a local alarm 162, which may be operatively attached to the support structure 102 (see FIG. 2; not shown in detail) and disposed in communication with the controller 156. Here, the local alarm 162 is configured to generate a local alarm output in response to the controller 156 issuing the ligature risk event alert A1. In some versions, the local alarm 162 may be realized as an audible alarm, such as a speaker, a beeper, or other device which generates an audible output. In some versions, the local alarm 162 may be realized as a visual alarm, such as a light which illuminates, blinks, flashes, and the like, or some other device which generates a visual output. In some versions, the local alarm 162 may include both an audible output (e.g., a speaker) and a visual output (e.g., an icon or indicia presented on a screen of the user interface 158). In some versions, the local alarm 162 may be formed as a part of (or is otherwise realized by) the user interface 158. As noted above, the local alarm 162 may be coupled to one or more locations about the patient support apparatus 100, and/or may be realized as a part of an in-room alarm system positioned nearby the patient support apparatus 100 and disposed in wired or wireless communication with the patient support apparatus 100.

In some versions, the predetermined period P1 is adjustable via the user interface 158, such as by one or more input devices 174 (e.g., via visual objects presented on a graphical user interface GUI). This may, for example, allow the caregiver to adjust the predetermined period P1 between different intervals of time (e.g., from a longer period of time to a shorter period of time, vice-versa, and the like) such as to accommodate personal preferences, to compensate for changes in patient behavior or indicia, and the like. Other configurations are contemplated.

In some versions, the predetermined period P1 is further defined as a first predetermined period P1, and the controller 156 may be further configured to issue a second ligature risk event alert A2 in response to the data D generated by the sensor system 160 satisfying the predetermined load criteria LC for a second predetermined period P2 beyond the first predetermined period P1. In some versions, the controller 156 is configured to relay the second ligature risk event alert A2 (or, in some versions, the first ligature risk event alert A1) via the communication interface 166 to the remote device 168 to activate the remote alarm 164. Here, for example, the remote alarm 164 could be generated by the remote device 168 which may be realized as a portable electronic device (e.g., a mobile phone, a pager, a tablet, and the like) carried by the caregiver. In some versions, the remote device 168 may be realized by multiple devices of the same or different types, such as by multiple portable electronic devices carried by different caregivers, and/or as by a remote patient monitoring system, a nurse call system, and the like. It will be appreciated that communication between the patient support apparatus 100 and other remote devices 168, systems, and the like may be effected via various types and configurations of communication interfaces 166, with or without a discrete network 170, via various forms of wired or wireless communication. Other configurations are contemplated. Here too, like the local alarm 162 described above, the remote alarm 164 could be of a number of different styles, types, and/or configurations.

As noted above, in some versions, the controller 156 may be configured to issue the second ligature risk event alert A2 in response to the data D generated by the sensor system 160 satisfying the predetermined load criteria LC for the second predetermined period P2 beyond the first predetermined period P1. In some versions, the first predetermined period P1 may be approximately ten seconds, and the second predetermined period P2 my be approximately five seconds beyond the ten seconds of the first predetermined period P1. It will be appreciated that this configuration can serve to provide the patient or other users of the patient support apparatus 100 with a warning associated with their actions prior to notifying a caregiver. For example, actions taken by the patient or others which may not necessarily correspond to a risk of self-harm but may nevertheless be undesirable (e.g., a visitor pulling on laterally on a side rail 128 of an empty patient support apparatus 100) may be ceased in response to the generation of the first ligature risk event alert (e.g., by startling the visitor). Here in this exemplary scenario, because the second predetermined period P2 occurs later in time than the first predetermined period P1, the second ligature risk event alert A2 is not transmitted to the remote device 168. It will be appreciated that this configuration may help prevent alerting the caregiver to "false positive" alarms. Nevertheless, it will be appreciated that the forgoing is an illustrative, non-limiting example of a scenario where the first ligature risk event alert A1 is issued by the controller 156 prior to the second ligature risk event alert A2. Here, other configurations are contemplated, and the first ligature risk event alert A1 may be issued simultaneously to the local alarm 162 and the remote alarm 164 at the first predetermined period P1. In some versions, the first ligature risk event alert A1 and the second ligature risk event alert A2 may each be issued to the local alarm 162 and/or to the remote alarm 164. Here, for example, where the local alarm 162 is realized as an audible alarm, the first ligature risk event alert A1 may activate the local alarm 162 to generate the local alarm output at a first volume level, and the second ligature risk event alert A2 may activate the local alarm 162 to generate the local alarm output at a second volume level that is louder than the first volume level. Thus, if the predetermined load criteria LC remain satisfied for beyond the first predetermined period P1, the local alarm output may become significantly louder. Here too, other configurations are contemplated.

In some versions, aspects of the local alarm 162 (and/or the remote alarm 164) may be adjustable via the user interface 158. For example, the intensity, volume, and/or type(s) of alarm outputs may be adjustable by the caregiver. Here too, the first predetermined period P1 and/or the second predetermined period P2 may be adjustable via the user interface 158 by the caregiver, such as to adjust the first predetermined period P1 to five seconds, and/or to adjust the second predetermined period P2 to an additional two seconds beyond the five seconds of the first predetermined period P1. It will be appreciated that the forgoing is an illustrative, non-limiting example of adjustability of the local alarm 162 and/or the remote alarm 164. Other configurations are contemplated. In some versions, the controller 156 may be configured to maintain activation of the local alarm 162 and/or the remote alarm 164 until being deactivated by the caregiver (e.g., via the user interface 158), even if the conditions which prompted issuance of the ligature risk event alerts A1, A2 are no longer present.

Figure 7A:
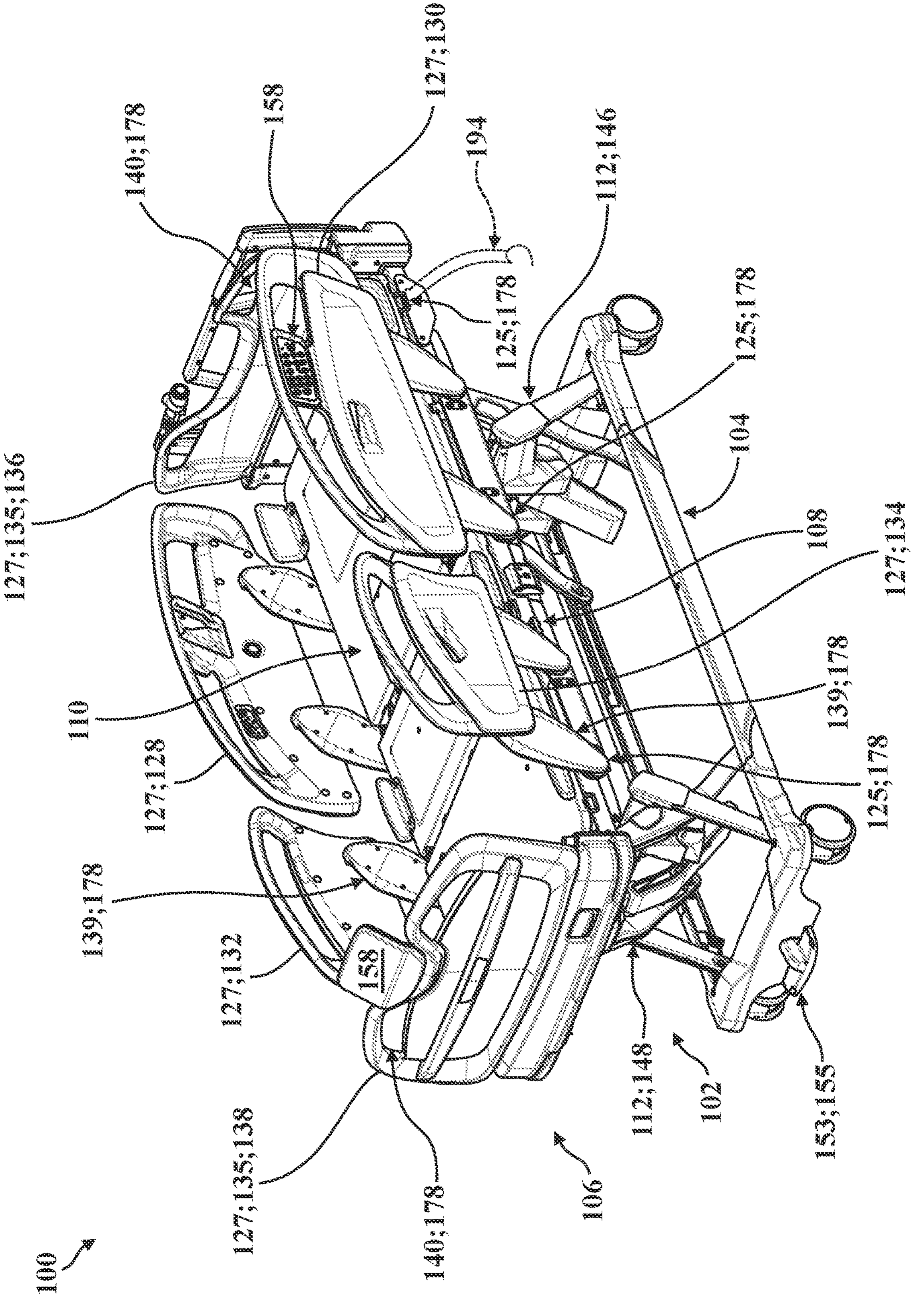
FIG. 7A is a perspective view of another version of the patient support apparatus of FIGS. 1-6, shown having side rails, a footboard, and a headboard coupled to mounts spaced above the base by the lift mechanism.
Figure 7B:
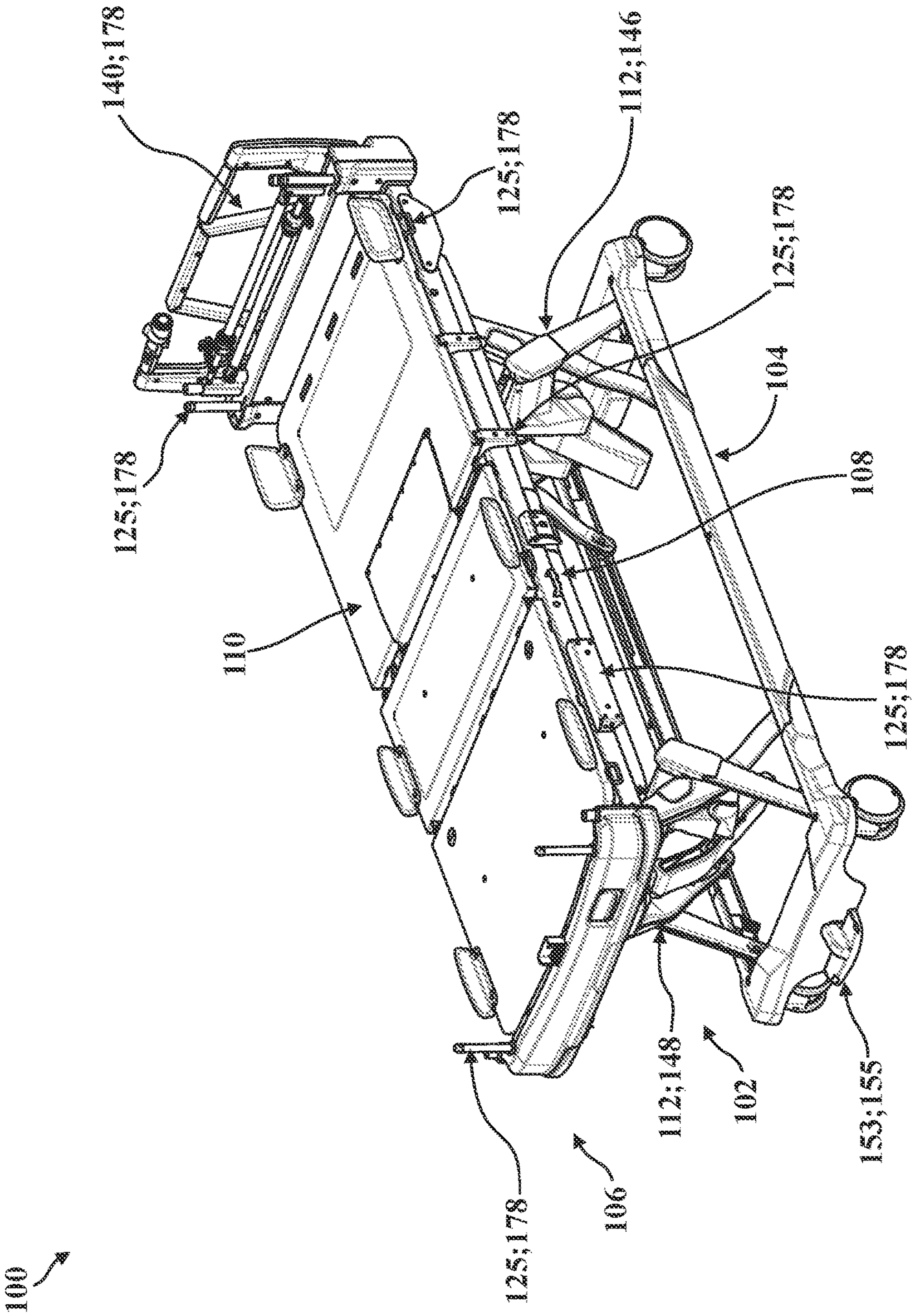
FIG. 7B is another perspective view of the patient support apparatus of FIG. 7A, shown with the side rails, the footboard, and the headboard removed for illustrative purposes.
Figure 7C:
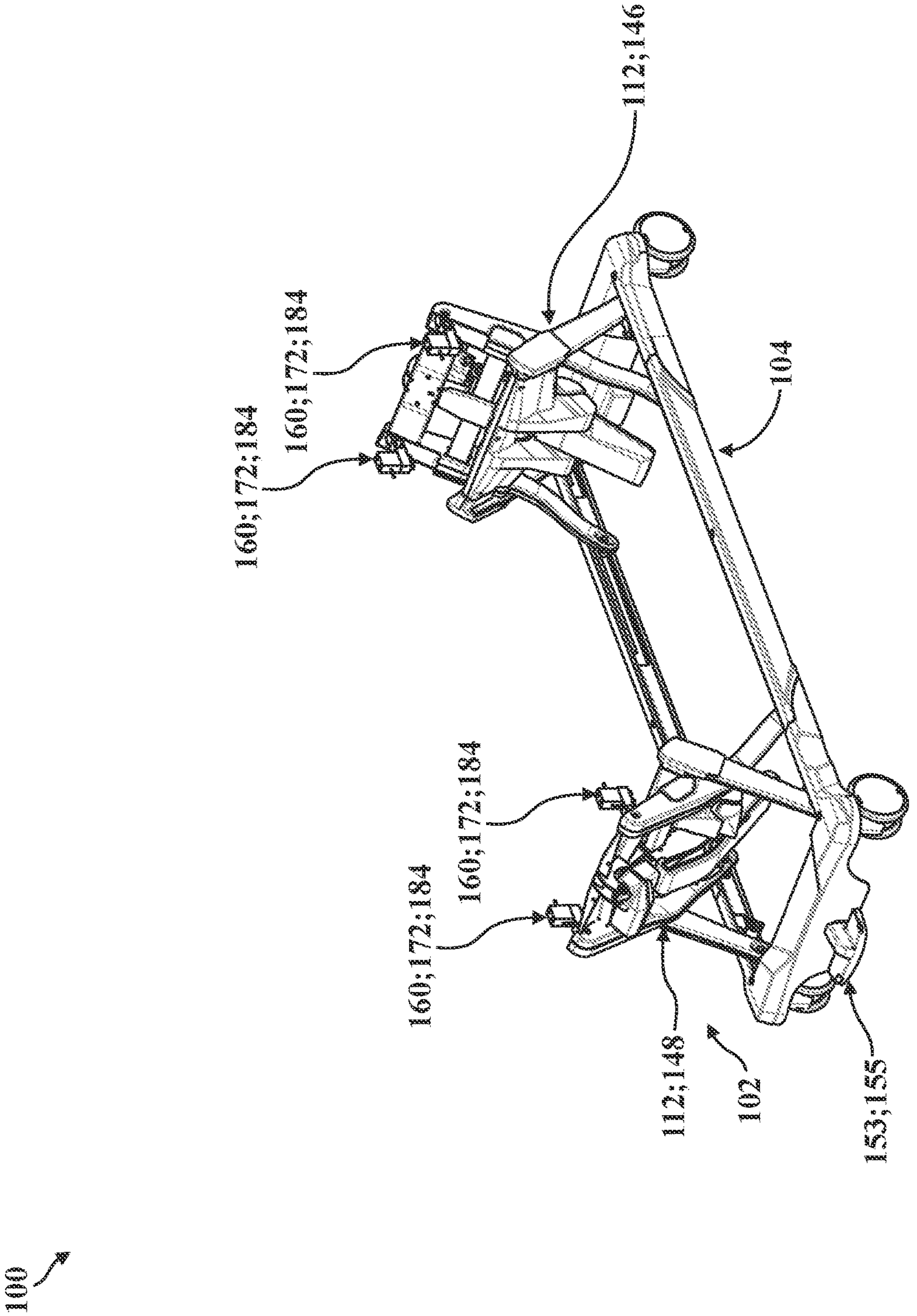
FIG. 7C is another perspective view of the patient support apparatus of FIGS. 7A-7B, shown with the intermediate frame removed for illustrative purposes to depict load cells of a sensor system.

Referring now to FIGS. 7A-7C, as noted above, the sensor system 160 is coupled to the support structure 102 to generate data D representing load acting on the support structure 102. In some versions, the sensor system 160 includes a plurality of load cells 184 (see FIG. 7C) interposed in force-translating relation between the intermediate frame 108 and the base 104 to measure load acting on the support structure 102. Here, each load cell 184 generates a respective output signal representing the amount of weight sensed thereby. More specifically, in the illustrated version, a total of four load cells 184 are interposed between the intermediate frame 108 and the lift members 146, 148 of the lift mechanism 112 to measure load (e.g., patient weight) acting about the patient support surface 116 as well as on other portions of the intermediate frame 108 or components coupled thereto.

It will be appreciated that other arrangements of load cells 184 are contemplated by the present disclosure, and different quantities of load cells 184 arranged in various ways may be employed by the sensor system 160. By way of non-limiting example, load cells could be interposed between the base 104 and the lift mechanism 112 (not shown). In some versions, aspects of the patient support apparatus 100, including the arrangement of load cells 184 about support structures 102, may be similar to as is described in International Patent Application Publication No. WO 2021/242946 A1, entitled "Lift Systems And Load Cells For Patient Support Apparatus;" International Patent Application Publication No. WO 2021/108377, entitled "Patient Support Apparatus With Load Cell Assemblies;" and/or U.S. Patent Application Publication No. US 2021/0030611 A1, entitled "Patient Support Apparatus With Load Cell Assemblies;" the disclosures of each of which are hereby incorporated by reference in their entirety. Other configurations are contemplated.

As is described in greater detail below in connection with FIGS. 8A-13C, while the illustrated version of the sensor system 160 employs load cells 184 to generate the data D representing load acting on the support structure 102, it will be appreciated that the sensor system 160 may be configured in other ways. By way of non-limiting example, the sensor system 160 may additionally or alternatively employ other types of sensors 172 to detect load relative to the ligature risk locations 178 and/or relative to the ligature safety zone 180, including such as by discrete mount sensors 172N adjacent to mounts 125, and/or by other types of sensors 172 such as optical sensors (e.g., a camera) configured to detect patient movement relative to the patient support apparatus 100. In some versions, aspects of the sensor system 160 or other portions of the patient support apparatus 100 may be similar to as is disclosed in U.S. Pat. No. 11,033,233, entitled "Patient Support Apparatus With Patient Information Sensors," the disclosure of which is hereby incorporated by reference in its entirety. Other configurations are contemplated. Furthermore, while operation of the load cells 184 of the sensor system 160 is illustrated with respect to a center of gravity indicia CG as described in greater detail below in connection with FIGS. 8A-13C, it will be appreciated that the controller 156 may be configured to interpret the data D generated by the sensor system 160 in a number of different ways, including without necessarily monitoring, calculating, or otherwise evaluating a center of gravity. In some versions, the sensor system 160 could evaluate changes in load such as by utilizing look-up tables, predetermined threshold values and/or ranges of predetermined output values for individual load cells (and/or groups of load cells), and the like. In some versions, the controller 156 may evaluate load cells 184 for force in specific directions, either "statically" (e.g., at predetermined intervals) or dynamically. In some versions, the sensor system 160 could evaluate changes in net weight (non-horizontal force). Other configurations are contemplated.

Referring now to FIGS. 2 and 7A-11, in some versions the patient support apparatus 100 includes a bed exit monitoring system 186 in communication with the controller 156 and configured to determine one or more of: patient movement about the patient support surface 116 corresponding to a pre-exit condition, and patient movement off of the patient support surface 116. Here, the user interface 158 may be configured to facilitate arming or otherwise operating the bed exit monitoring system 186 between a monitoring state 186M to monitor patient movement, and an off state 1860. In some versions, the controller 156 may be configured to interrupt monitoring the data D generated by the sensor system 160 relative to the predetermined load criteria LC during operation of the bed exit monitoring system 186 in the monitoring state 186M. Put differently, the controller 156 may be configured to interrupt operation of the perimeter load detection system 161 and not generate the ligature risk event alert A1 when the bed exit monitoring system 186 is active (e.g., operating in the monitoring state 186M) or when the patient is otherwise detected on the mattress 126. However, other configurations are contemplated. It will be appreciated that the load cells 184 may be utilized by both the bed exit monitoring system 186 and the perimeter load detection system 161, or separate sets of sensors of the same or different types may be utilized by each system 161, 186.

In some versions, the controller 156 may be configured to activate the perimeter load detection system 161 following a predetermined sequence of events, such as following patient egress. Here, by way of illustrative example, patient egress could be defined based on lift sensors 172L indicating that the intermediate frame 108 is at a low enough height for egress, barrier sensors 172B subsequently indicating that one or more side rails 128, 130, 132, 134 have been lowered, and the load cells 184 subsequently indicating that the patient's weight is no longer sensed on the patient support surface 116. Another exemplary sequence that could result in the controller 156 activating the perimeter load detection system 161 could be defined based on barrier sensors 172B indicating that one or more side rails 128, 130, 132, 134 have been raised during a period where the patient's weight is not sensed by the load cells 184. It will be appreciated that the forgoing are illustrative examples of potential sequences of events which could need to be satisfied before the controller 156 may activate the perimeter load detection system 161. Other configurations are contemplated, and various events could need to be satisfied either in a particular sequence or concurrent with other events, and events could be sensed or otherwise determined in various ways.

Figure 8A:
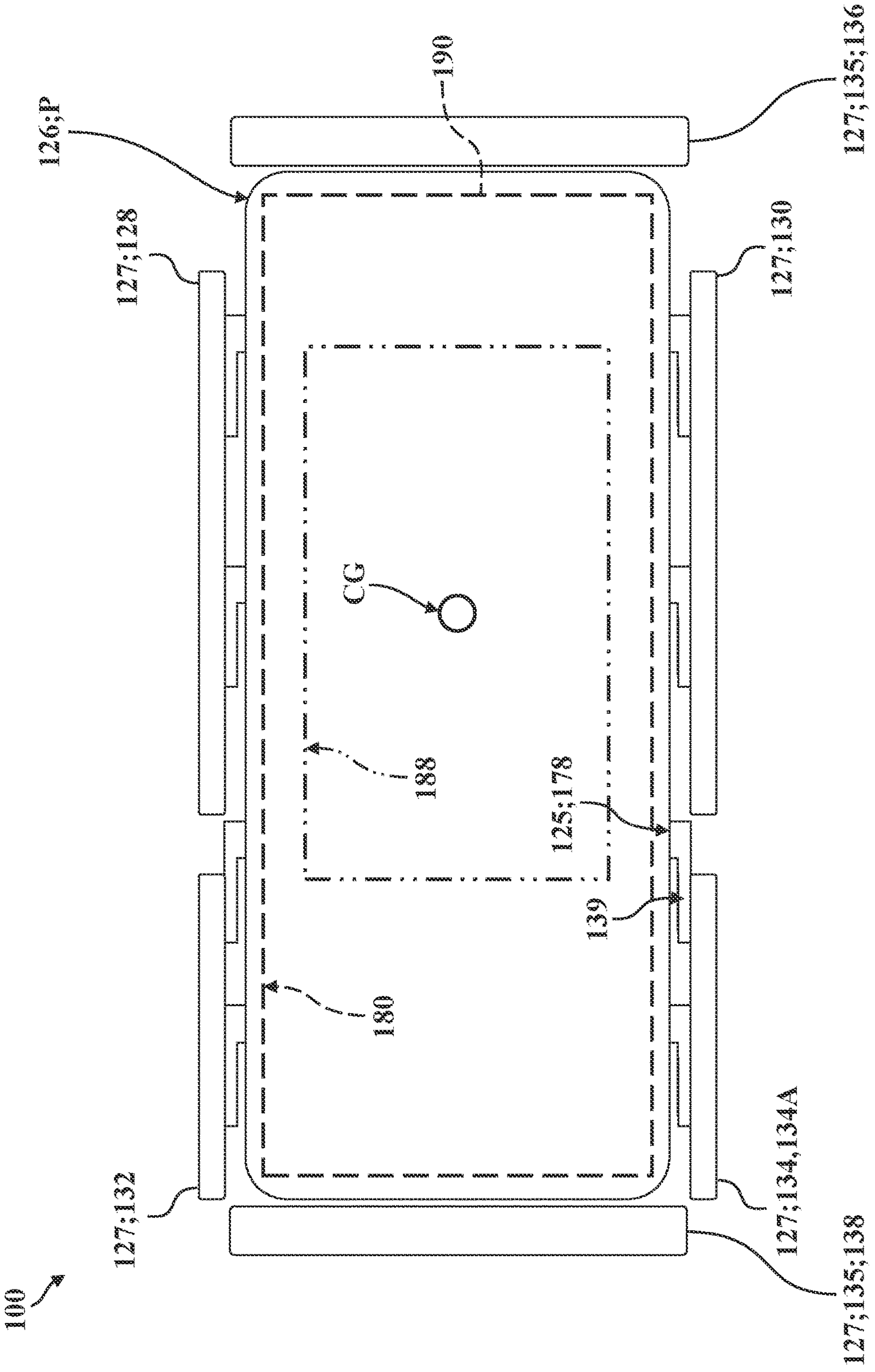
FIG. 8A is a top-side schematic view of the patient support apparatus of FIGS. 1-7C, shown depicting exemplary bed exit and ligature safety zones defined retaliative to a patient support surface, with an illustrative center of gravity indicia determined by the sensor system shown centered on the patient support surface.
Figure 8B:
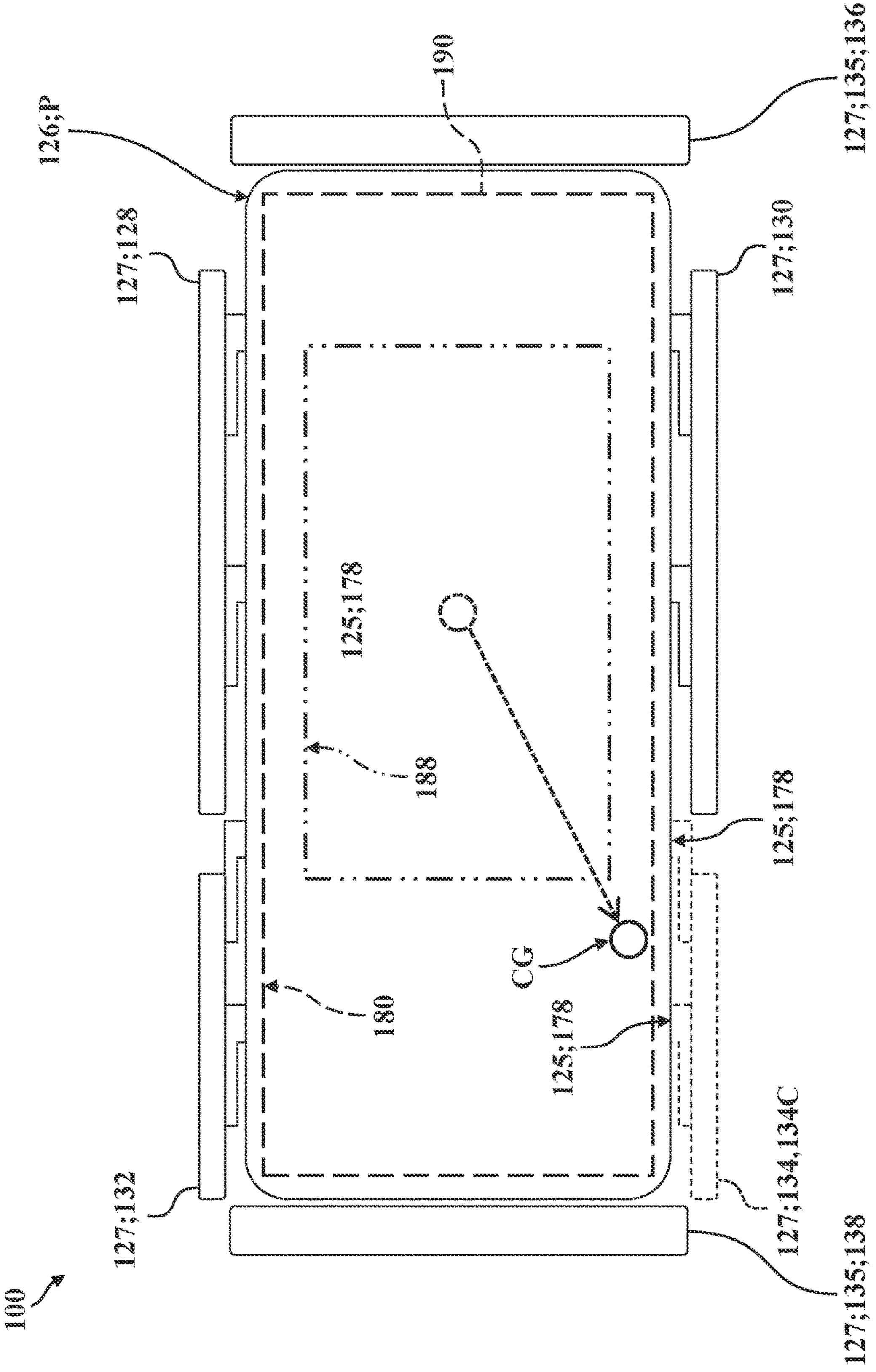
FIG. 8B is another top-side schematic view of the patient support apparatus of FIG. 8A, shown with the center of gravity indicia having moved outside of a bed exit zone to illustrate bed exit detection via the sensor system.

In some versions, a bed exit zone 188 may be defined relative to the patient support surface 116 for the bed exit monitoring system 186 to monitor changes in patient load during operation in the monitoring state 186M. The bed exit zone 188 may be defined in various ways, and is depicted in FIGS. 8A-11 as being separate from the ligature safety zone (as well as from the ligature risk zones 182 described in greater detail below). FIGS. 8A-8B illustrate operation of the bed exit monitoring system 186 in the monitoring state 186M, with FIG. 8A depicting the center of gravity indicia CG arranged within both the bed exit zone 188 and within the ligature safety zone 180 to illustrate a scenario where the patient is supported on the patient support surface 116 as determined via the load cells 184. In FIG. 8B, the center of gravity indicia CG is shown as having shifted outside of the bed exit zone 188, but remains within the ligature safety zone 180 to illustrate a scenario where the patient has shifted about the patient support surface 116 into a position consistent with a pre-exit condition as determined by the bed exit monitoring system 186 via the load cells 184. Here, the controller 156 may issue a bed exit alert, alarm and the like, such as by activating the local alarm 162, the remote alarm 164, and/or another alarm.

In some versions, multiple bed exit zones 188 may be employed, such as one zone to determine pre-exit conditions and a different zone to determine exit conditions. Similar to the ligature safety zone 180 and/or the ligature risk zones 182 described in greater detail below, the bed exit zone 188 may be adjustable, such as via the user interface 158 and/or based on changes in the arrangement of deck sections 114 and/or barriers 127. In some versions, aspects of the bed exit monitoring system 186 and/or other portions of the patient support apparatus 100 may be similar to as is disclosed in U.S. Pat. No. 9,539,156, entitled "Hospital Bed;" U.S. Pat. No. 10,617,327, entitled "Exit Detection System With Compensation;" and/or U.S. Pat. No. 10,786,408, entitled "Person Support Apparatuses With Exit Detection Systems;" the disclosures of each of which are hereby incorporated by reference in their entirety. Other configurations are contemplated.

As noted above, the brake assembly 153 is provided to facilitate releasably retaining the wheels 142 the braked state 153B to inhibit movement of the patient support apparatus 100 about floor surfaces. In some versions, the patient support apparatus 100 includes a brake sensor 172K disposed in communication with the controller 156 and with the brake assembly 153 to determine operation of the brake assembly 153 between the braked state 153B and the unbraked state 153U. Here, the controller 156 may be configured to interrupt monitoring the data D generated by the sensor system 160 relative to the predetermined load criteria LC during operation of the brake assembly 153 in the unbraked state 153U determined by the brake sensor 172K. Put differently, the controller 156 may be configured to interrupt operation of the perimeter load detection system 161 and not generate the ligature risk event alert A1 when the brake assembly 153 operates in the unbraked state 153U. However, other configurations are contemplated. It will be appreciated that the brake sensor 172K may be of a number of different types, styles, and/or configurations, including without limitation a limit switch, touch sensor, potentiometer, encoder, or other type of sensor responsive to changes in position, contact, orientation, and the like. In some versions, the brake sensor 172K is operatively attached to the brake lever 155 to determine changes in operation of the brake assembly 153. In some versions, the brake sensor 172K could be realized as code operated by the controller 156 (e.g., a commanded state change corresponding to an electric brake system operated via the graphical user interface GUI of the user interface 158). Other configurations are contemplated.

As noted above, in some versions the controller 156 is configured to monitor data D from the sensor system 160 during operation of the brake assembly 153 in the braked state 153B and during operation of the bed exit monitoring system 186 in the off state 1860. Put differently, the controller 156 may be configured to interrupt operation of the perimeter load detection system 161 and not generate the ligature risk event alert A1 when the patient is currently on the mattress 126 and/or when the patient support apparatus 100 is being transported (e.g., when motion is detected via one or more sensors 172). It will be appreciated that these types of conditions can be detected or otherwise determined in ways other than based on whether or not various components, systems, sub-systems, and the like of the control system 154 or other portions of the patient support apparatus 100 are operating in a certain state, mode, and the like. Thus, it is contemplated that in some versions the bed exit monitoring system 186 could be operational while the controller 156 also monitors for changes in load relative to the ligature safety zone 180 and/or ligature risk zone 182 (see FIG. 12), but without necessarily operating the perimeter load detection system 161 in a way which would issue alerts or otherwise activate alarms. Similarly, it is contemplated that the controller 156 could monitor for changes in load relative to the ligature safety zone 180 and/or ligature risk zone 182 even when the brake assembly 153 is in the unbraked state 153U, but without necessarily operating the perimeter load detection system 161 in a way which would issue alerts or otherwise activate alarms. Such scenarios could be adjustable and/or activatable by the caregiver or other users via the user interface 158. Other configurations are contemplated.

Figure 9:
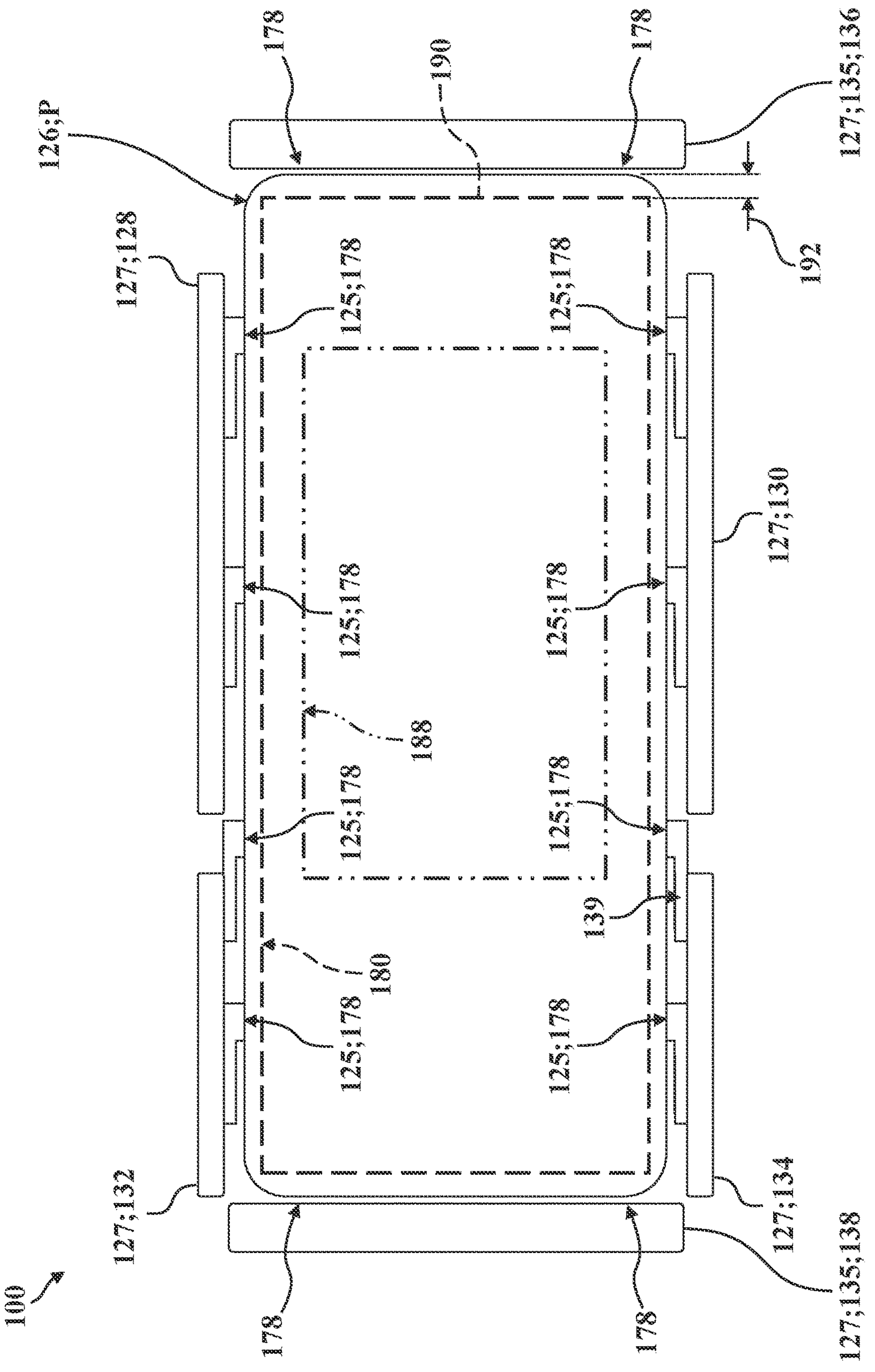
FIG. 9 is another top-side schematic view of the patient support apparatus of FIGS. 8A-8B, shown without a center of gravity indicia depicted to illustrate an absence of patient weight applied to the patient support apparatus.
Figure 10:
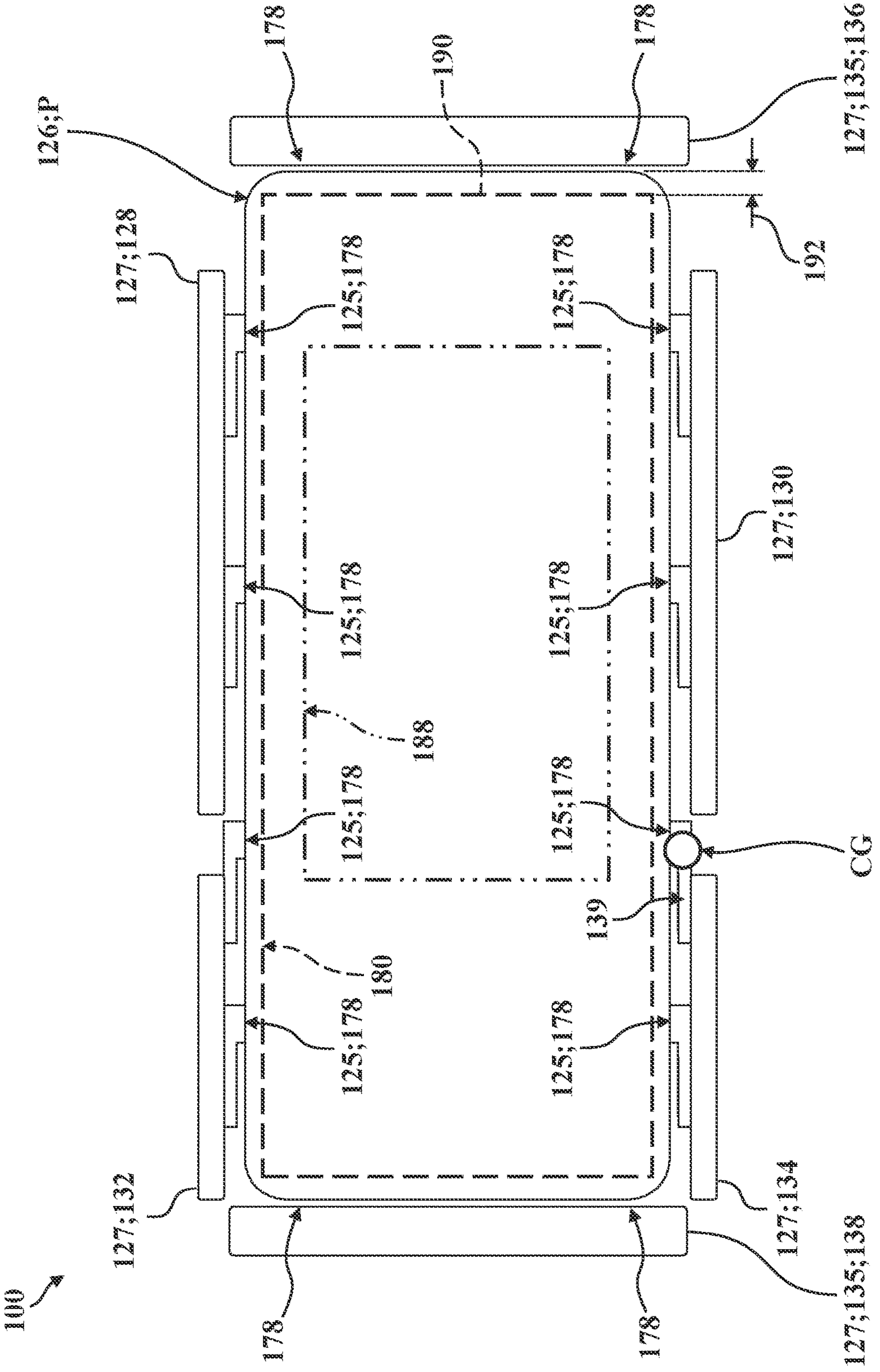
FIG. 10 is another top-side schematic view of the patient support apparatus of FIG. 9, shown with a center of gravity indicia arranged outside of the ligature safety zone and adjacent to a mount to illustrate a ligature risk event.

FIG. 9 depicts a scenario where no patient is detected on the patient support surface 116, such as prior to a patient having been supported on the mattress 126, or such as following patient egress. In any event, in this scenario, no weight attributable to the patient is detected by the sensor system 160, and the predetermined load criteria LC is not satisfied. However, FIG. 10 depicts a scenario where the data D generated by the sensor system 160 indicates a distribution of load acting on the support structure outside of the ligature safety zone 180. Here, the load is represented by the center of gravity indicia CG as being concentrated adjacent to one of the mounts 125 for the fourth side rail 134. In this case, if the distribution of load acting on the support structure 102 satisfies the predetermined load criteria LC and persists outside of the ligature safety zone 180 for the predetermined period P1, the controller 156 will issue the ligature risk event alert A1 as noted above.

Those having ordinary skill in the art will appreciate that the predetermined load criteria LC could be defined in a number of different ways, including without limitation based on characteristics of the patient (e.g., weight, height, mental state, and the like), which may be determined via sensors 172, the sensor system 160, and/or could be received by the controller 156 via the network 170 and/or via the user interface 158 (e.g., entered by the caregiver). Here too, the predetermined load criteria LC could be scaled or otherwise adjusted by the caregiver or other users (e.g., via the user interface 158), such as to require a smaller overall amount of weight to be concentrated adjacent to one or more ligature risk locations 178 for certain patients. In some versions, load concentration adjacent to certain ligature risk locations 178 may be associated with different predetermined load criteria LC than other ligature risk locations 178, such as for example to require less overall load applied to mounts 125 for end boards 135 than for mounts 125 of linkages 139 for side rails 128, 130, 132, 134. In any event, the determination of the predetermined load criteria LC may be at least partially adjustable via the user interface 158. In some versions, the controller 156 is configured to define the predetermined load criteria LC based at least partially on an amount of weight applied to or otherwise acting on the intermediate frame 108 relative to the base 104 (e.g., weight applied to the patient support surface 116) determined with the plurality of load cells 184. By way of non-limiting example, the weight of various types of equipment, accessories, and/or removable components of the patient support apparatus 100 could be considered by the controller 156 (e.g., using sensors, user interfaces, and the like) in defining the predetermined load criteria LC and/or how changes in weight distribution are evaluated (e.g., to more accurately determine patient location, weight, movement, and the like). In some versions, historical changes in weight applied to or otherwise acting on the intermediate frame 108 relative to the base 104 over time could also considered by the controller 156 in defining the predetermined load criteria LC and/or to improve the accuracy, sensitivity, and/or speed of detection of changes in weight distribution. For example, the controller 156 may be able to store a weight value associated with the weight of the last patient supported on the patient support apparatus 100 to determine the predetermined load criteria LC, and different predetermined load criteria LC could be used in situations where the last patient supported was relatively heavy and/or relatively lightweight. Other configurations are contemplated.

Figure 11:
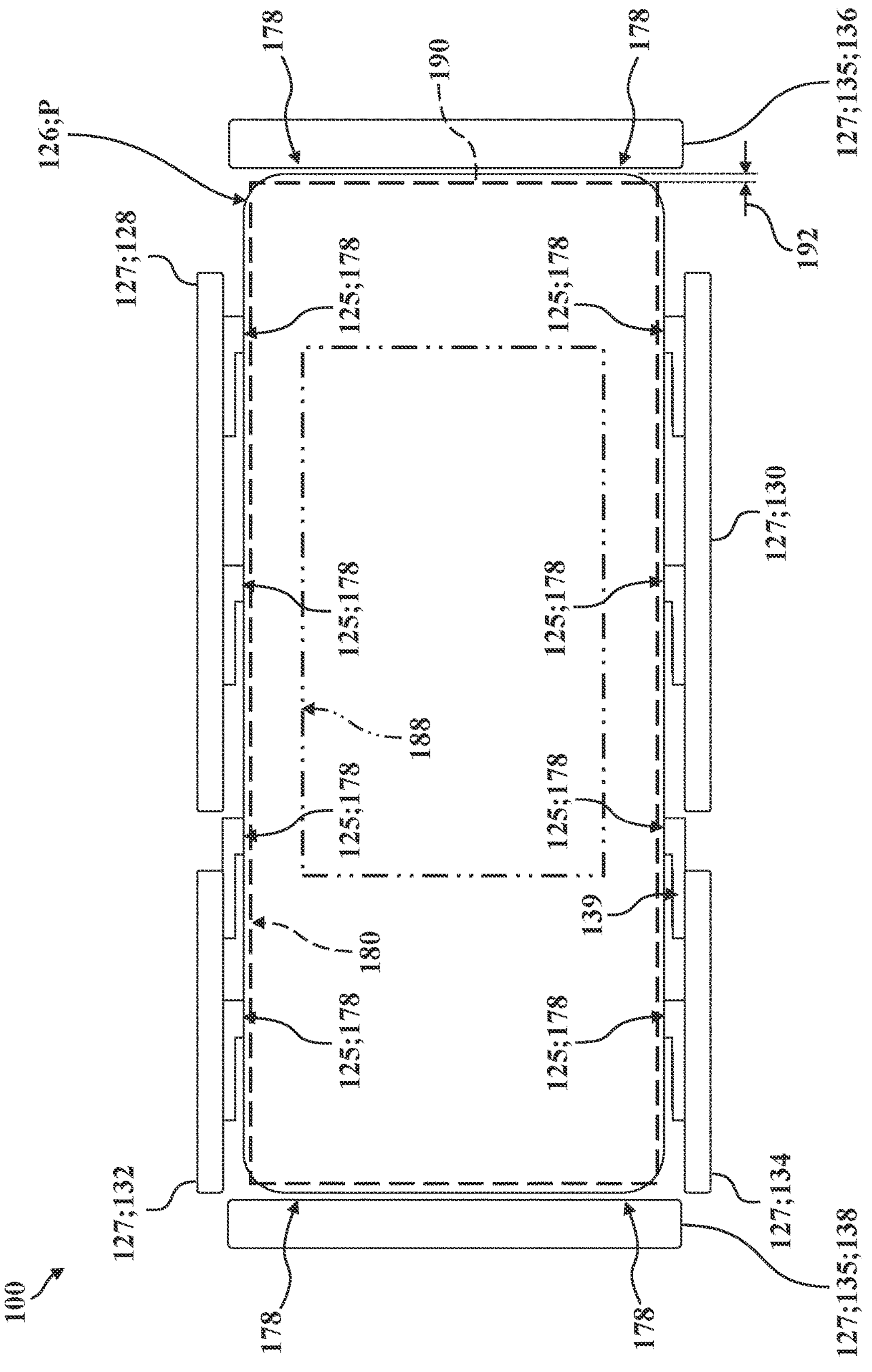
FIG. 11 is another top-side schematic view of the patient support apparatus of FIGS. 8A-10, shown with a differently configured ligature safety zone.

Referring now to FIGS. 9-11, in some versions, the ligature safety zone 180 may include a peripheral edge 190 defined adjacent to the periphery P of the patient support surface 116 (e.g., defined by the mattress 126 and/or the patient support deck 110). Here, the peripheral edge is spaced inwardly from the periphery P of the patient support surface 116 by a predetermined periphery offset value 192. In some versions, the periphery offset value 192 is adjustable, such as via the user interface 158, to facilitate detecting the load concentration in different ways based, for example, on caregiver preference, patient behavior or characteristics, and the like. In FIG. 9, for example, the periphery offset value 192 is different than the version illustrated in FIG. 11, which is arranged in closer proximity to the periphery P of the patient support surface 116. While the ligature safety zone 180 is illustrated as having a generally rectangular profile that may be scaled (e.g., compare FIG. 9 to FIG. 11) or otherwise adjusted, it will be appreciated that the ligature safety zone 180, the ligature risk zone 182, and/or the bed exit zone 188 could each have or otherwise define various shapes, which may overlap, and/or may which may be adjustable (e.g., via the user interface 158) in various ways. In some versions, the zones 180, 182, 188 may be adjustable similar to as is described in U.S. Pat. No. 10,786,408, previously referenced. Other configurations are contemplated.

As noted above, the lift mechanism 112 may be operated by the controller 156 and is interposed between the base 104 and the patient support deck 110 to move the intermediate frame 108 relative to the base 104 between the plurality of vertical configurations. In some versions, a lift sensor 172L is disposed in communication with the controller 156 to determine an arrangement of the intermediate frame 108 relative to the base 104, and the controller 156 is configured to monitor the data D generated by the sensor system 160 relative to the predetermined load criteria LC in response to the intermediate frame 108 being in a predetermined lift configuration. Those having ordinary skill in the art will appreciate that the lift sensor 172L could be realized in a number of different ways. By way of non-limiting example, the lift sensor 172L could be realized as one or more discrete components, such as a linear potentiometer, a range sensor, a hall-effect sensor, a limit switch, an accelerometer, a gyroscope, and the like generally configured or arranged to measure position, height, and/or movement. Further, the lift sensor 172L could be an encoder, a current sensor, and the like coupled to or in communication with one of the lift actuators 150. Moreover, the functionality afforded by the lift sensor 172L could be entirely or partially realized with software or code for certain applications. In some versions, each lift member 146, 148 may employ a respective lift sensor 172L. Other configurations are contemplated.

It will be appreciated that the predetermined lift configuration could be defined in various ways, such as corresponding to one or more of the arrangements of the intermediate frame 108 depicted throughout FIGS. 3A-6, and may be determined with the lift sensor 172L and/or via user engagement with the user interface 158. The predetermined lift configuration could be adjustable via the user interface 158, and the controller 156 may operate the lift mechanism 112 to move the intermediate frame 108 between different lift configurations based on user engagement with the user interface 158. Here, for example, the predetermined lift configuration could be defined with the intermediate frame 108 arranged in one of the plurality of vertical configurations other than the maximum lowered configuration 106B (see FIG. 4B). Put differently, the controller 156 may be configured to interrupt operation of the perimeter load detection system 161 and not generate the ligature risk event alert A1 when the intermediate frame 108 is arranged in certain ways relative to the base 104. Other configurations are contemplated. In any event, in some versions, the controller 156 may be configured to define the predetermined load criteria LC based at least partially on the arrangement of the intermediate frame 108 relative to the base 104 determined with the lift sensor 172L. In some versions, the predetermined load criteria LC may be scaled or otherwise interpreted differently when the intermediate frame 108 is closer to the base 104, and/or when the intermediate frame 108 is spaced further from the base 104. By way of non-liming example, the controller 156 may be configured to define the predetermined load criteria LC so as to require a lower overall amount of load to be sensed outside of the ligature safety zone 180 before issuing the ligature risk event alert A1 when the intermediate frame 108 is spaced at a maximum raised configuration (not shown in detail) as opposed to when the intermediate frame 108 is spaced closer to the maximum lowered configuration. Other configurations are contemplated.

In some versions, a deck sensor 172D is used to determine movement of the deck section 114 (specifically, the back section 118 in the illustrated version) from and between the first section position 114A (see FIGS. 3A-4B), the second section position 114B (see FIGS. 5-6), and one or more intermediate section positions between the first and second section positions 114A, 114B, such as via the one or more deck actuators 152. The deck sensor 172D is disposed in communication with the controller 156 to determine an arrangement of the deck section 114 relative to the intermediate frame 108, and the controller 156 is configured to monitor the data D generated by the sensor system 160 relative to the predetermined load criteria LC based at least partially on the arrangement of the deck section 114 determined with the deck sensor 172D. It will be appreciated that the deck sensor 172D could be realized in a number of different ways. By way of non-limiting example, the deck sensor 172D could be realized as a discrete component such as a rotary potentiometer, a range sensor, a hall-effect sensor, a limit switch, an accelerometer, a gyroscope, and the like generally configured or arranged to measure position, height, or movement. Further, the deck sensor 172D could be an encoder, a current sensor, and the like coupled to or in communication with the deck actuator 152. Moreover, the functionality afforded by the deck sensor 172D could be entirely or partially realized with software or code for certain applications. In some versions, each deck section 114 may employ a respective deck sensor 172D. Other configurations are contemplated.

Figure 12:
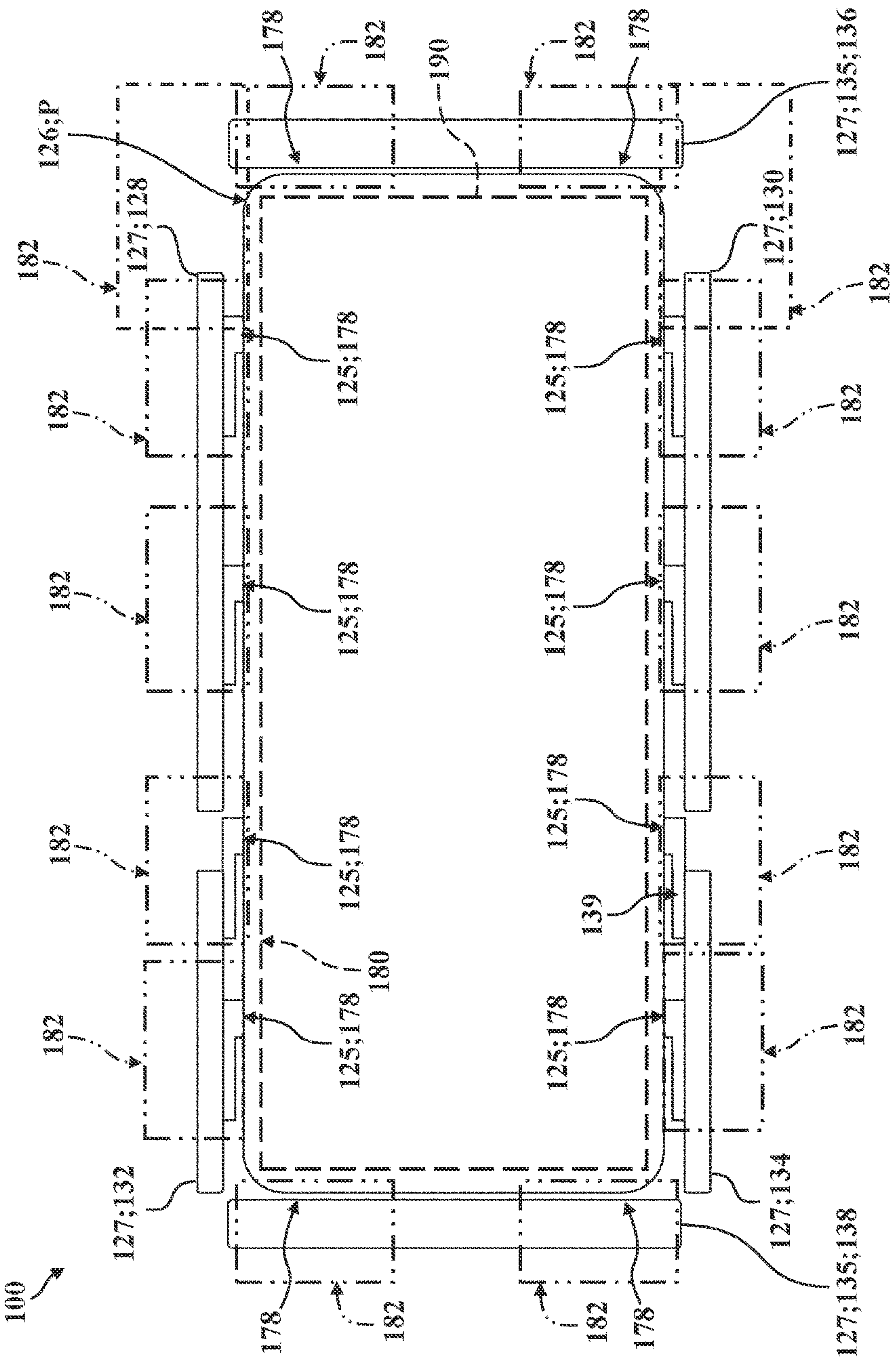
FIG. 12 is another top-side schematic view of the patient support apparatus of FIGS. 8A-11, shown with a plurality of ligature risk zones arranged adjacent to different ligature risk locations.
Figure 13A:
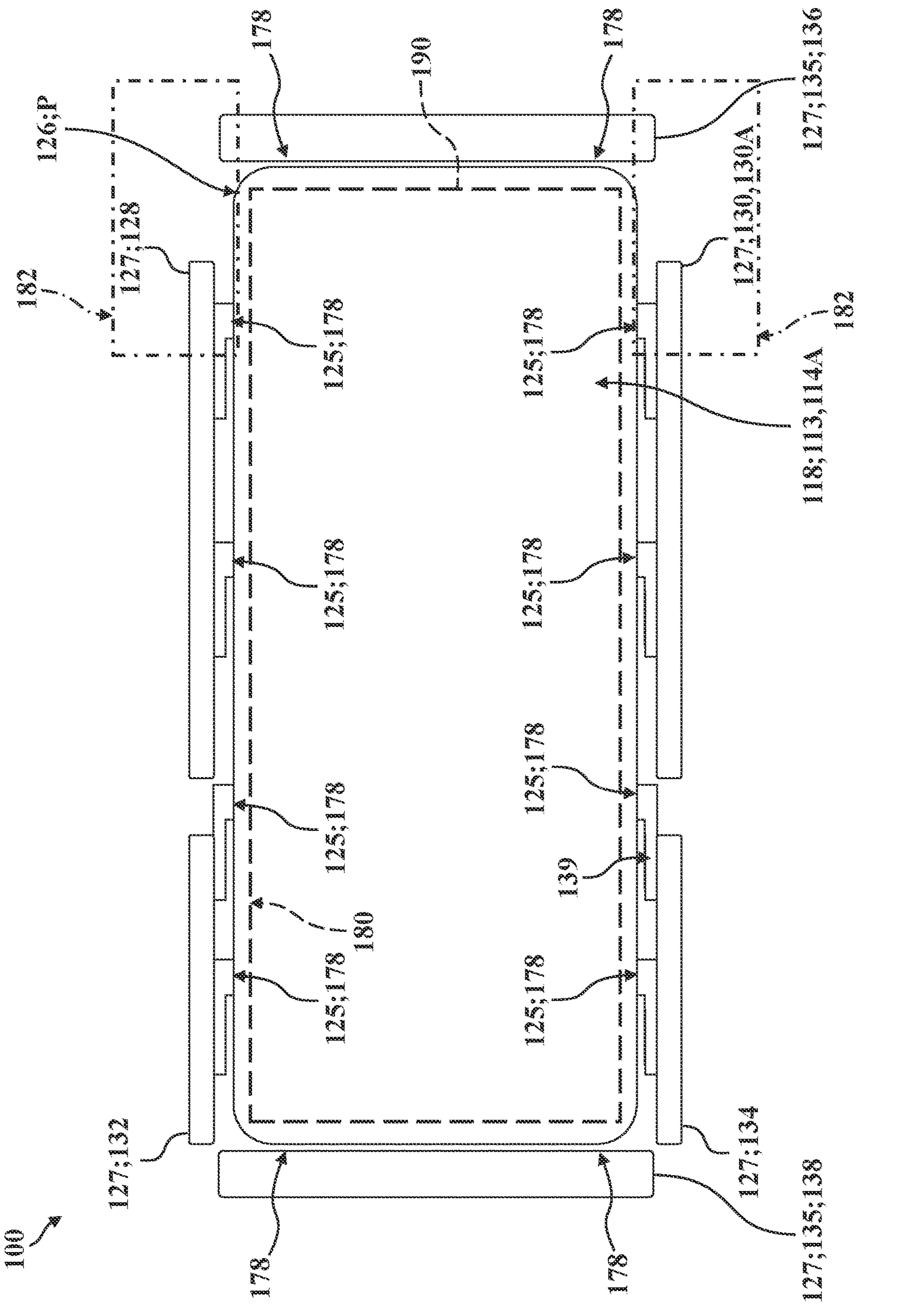
FIG. 13A is another top-side schematic view of the patient support apparatus of FIG. 12, shown with two of the ligature risk zones associated with mounts for side rails coupled to the back section to illustrate one configuration of the ligature risk zones during operation of the back section in a flat position with the side rails each arranged in the raised position.
Figure 13B:
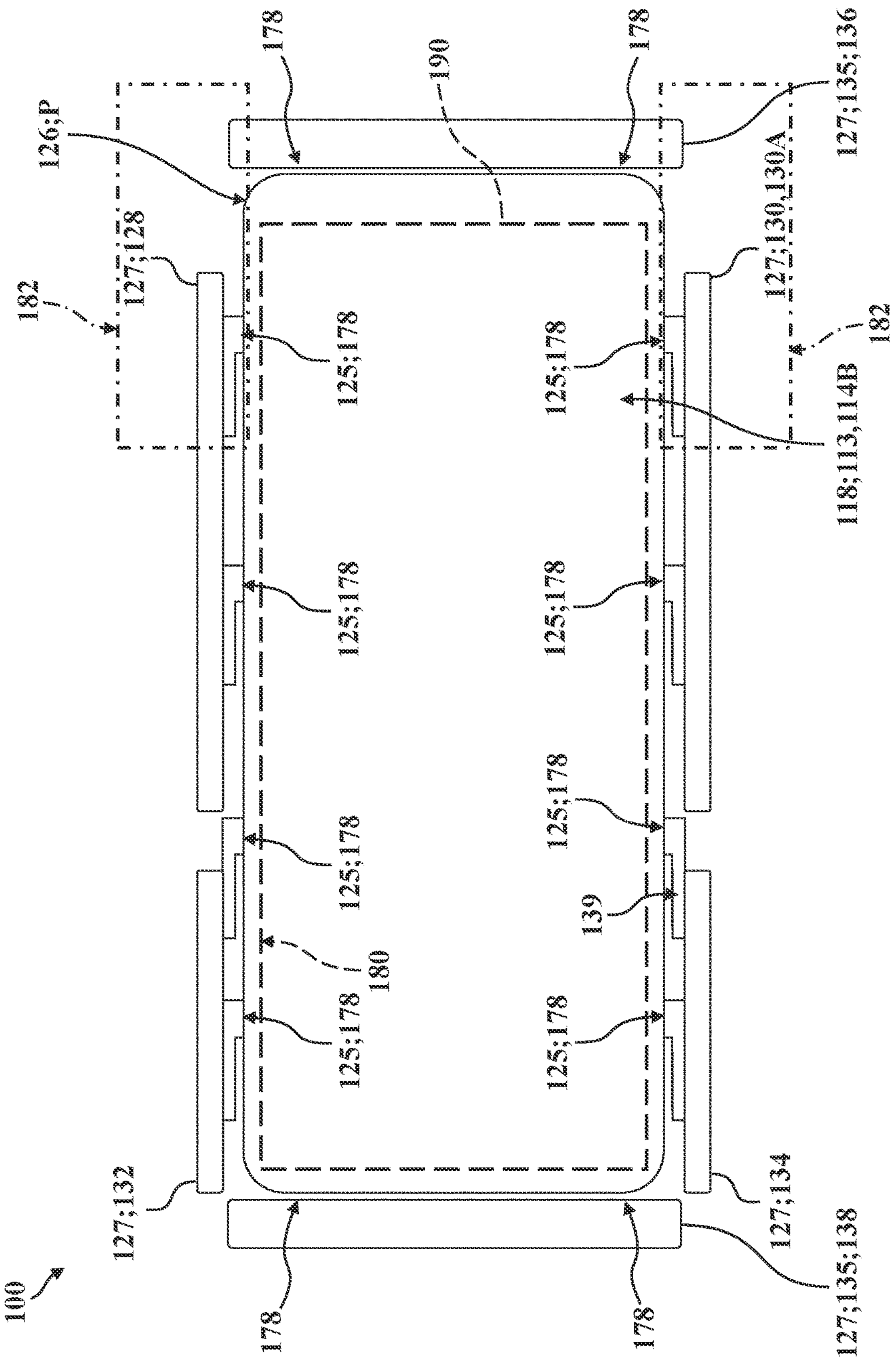
FIG. 13B is another top-side schematic view of the patient support apparatus of FIG. 13A, shown with the two ligature risk zones associated with mounts for the side rails coupled to the back section having changed to illustrate another configuration of the ligature risk zones during operation of the back section in a fowler's position with the side rails each still arranged in the raised position.
Figure 13C:
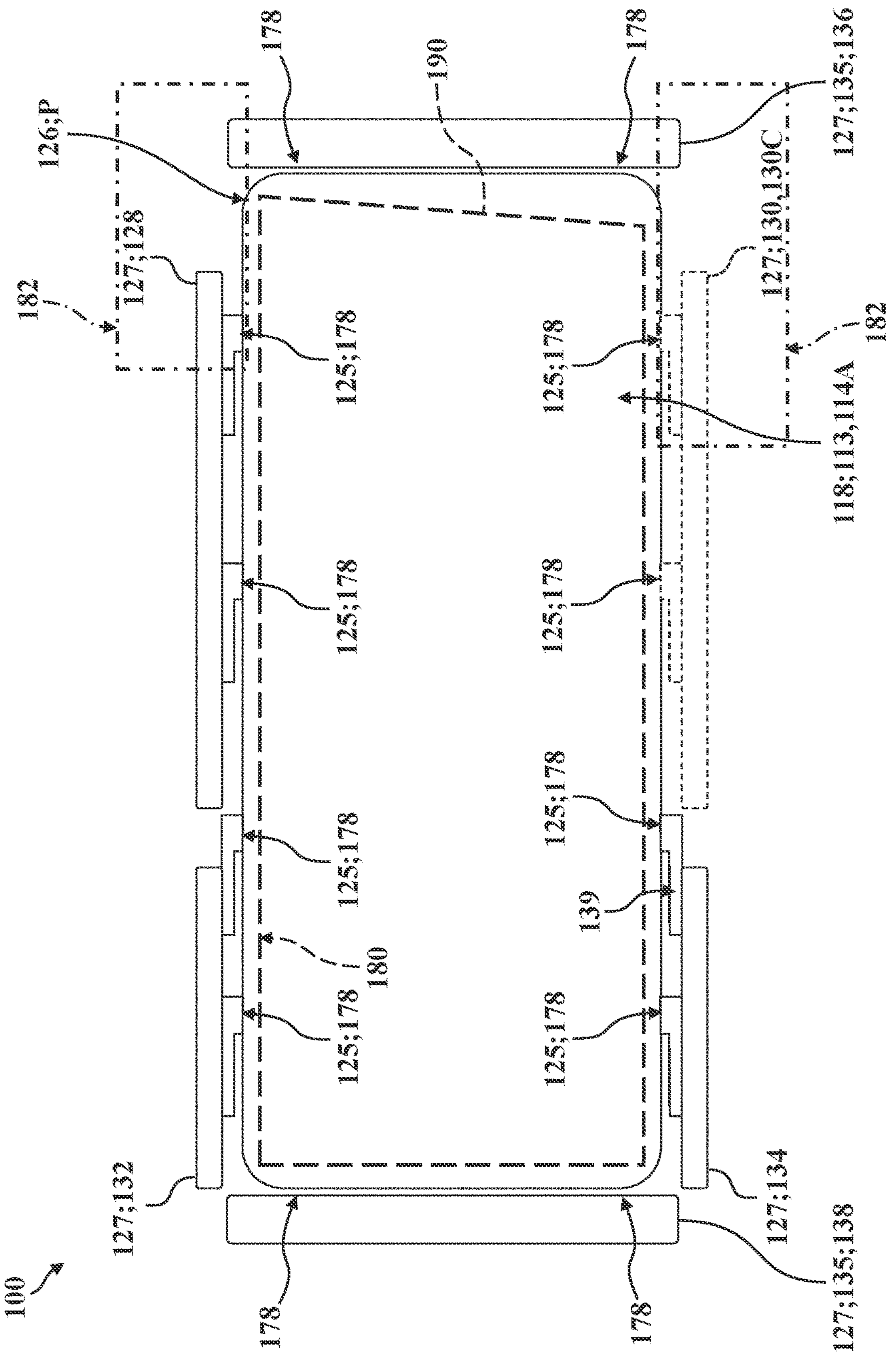
FIG. 13C is another top-side schematic view of the patient support apparatus of FIG. 13A, shown with the two ligature risk zones associated with mounts for one of the side rails coupled to the back section having changed to illustrate another configuration of the ligature risk zones during operation of the back section still in the flat position and with one of the side rails arranged in the lowered position.

In some versions, the controller 156 is further configured to adjust the ligature safety zone 180 and/or the ligature risk zone(s) 182 based at least partially on the arrangement of the patient support deck 110 determined via the deck sensor 172D (and/or the lift sensor 172L). By way of illustrative example, FIG. 13A schematically depicts the ligature safety zone 180 and two ligature risk zones 182 defined based on the deck section 114 being arranged in the first section position 114A (more specifically, with the back section 118 arranged in a flat position), and FIG. 13B schematically depicts a change in both the ligature safety zone 180 and two exemplary ligature risk zones 182 arranged at the head-end corners that are illustratively defined based on the deck section 114 now being arranged in the second section position 114B (more specifically, with the back section 118 arranged in a fowler's position). Here, the head-end of the peripheral edge 190 of the ligature safety zone 180 has moved towards the foot-end to account for movement of potential ligature risk locations 178 on the back section 118 (or components coupled thereto) having been repositioned due to movement of the back section 118 (e.g., moving closer towards the foot-end). Here too, because the first and second side rails 128, 130 are coupled to the back section 118 in this version, corresponding ligature risk zones 182 associated with the first and second side rails 128, 130 (e.g., handles and/or mounts) have also been changed, and now extend closer towards the foot-end (see FIG. 13B, compare with FIG. 13A). It will be appreciated that the forgoing represent illustrative, non-limiting examples of ways in which zones 180, 182 could be shifted or otherwise adjusted based on movement of the deck sections 114. Here too, it will be appreciated that the exemplary ligature risk zones 182 arranged at the head-end corners of FIGS. 12-13C are intended to be non-limiting, illustrative examples of how ligature risk zones 182 could be defined and/or changed based on movement of components of the patient support apparatus 100. More specifically, one or more ligature risk zones 182 could also be arranged at the foot-end corners and/or in other locations, and various ligature risk zones 182 could encompass a single or multiple ligature risk locations 178. Other configurations are contemplated.

In some versions, one or more barrier sensors 172B are used to determine movement of the side rails 128, 130, 132, 134 (and/or their linkage 139) relative to the intermediate frame 108 or another portions of the support structure 102 between the plurality of side rail positions, such as respective raised positions 128A, 130A, 132A, 134A, intermediate positions 128B, 130B, 132B, 134B, and lowered positions 128C, 130C, 132C, 134C. The one or more barrier sensors 172B are disposed in communication with the controller 156 to determine an arrangement of one or more of the side rails 128, 130, 132, 134 relative to the intermediate frame 108, and the controller 156 is configured to monitor the data D generated by the sensor system 160 relative to the predetermined load criteria LC based at least partially on the arrangement of the side rails 128, 130, 132, 134 determined with the one or more barrier sensors 172B. It will be appreciated that the barrier sensor 172B could be realized in a number of different ways. By way of non-limiting example, the barrier sensor 172B could be realized as a discrete component such as a rotary potentiometer, a range sensor, a hall-effect sensor, a limit switch, an accelerometer, a gyroscope, and the like generally configured or arranged to measure position, height, or movement. Further, the barrier sensor 172B could be an encoder, a current sensor, and the like. Moreover, the functionality afforded by the barrier sensor 172B could be entirely or partially realized with software or code for certain applications. In some versions, each side rail 128, 130, 132, 134 may employ a respective barrier sensor 172B. Other configurations are contemplated.

In some versions, the controller 156 is further configured to adjust the ligature safety zone 180 and/or the ligature risk zone(s) 182 based at least partially on the arrangement of the side rails 128, 130, 132, 134 determined via the barrier sensor 172B. By way of illustrative example, FIG. 13A schematically depicts the ligature safety zone 180 and two ligature risk zones 182 defined based on the second side rail 130 raised position 130A, and FIG. 13C schematically depicts a change in both the ligature safety zone 180 and the two ligature risk zones 182 defined based on the second side rail 130 now being arranged in the lowered position 130C. Here, a corner of the head-end of the peripheral edge 190 of the ligature safety zone 180 has moved towards the foot-end to account for movement of potential ligature risk locations 178 on the second side rail 130 having been repositioned. Here too, the ligature risk zone 182 associated with the second side rail 130 has also been changed, and now extends closer towards the foot-end (see FIG. 13C, compare with FIG. 13A). It will be appreciated that the forgoing represent illustrative, non-limiting examples of ways in which zones 180, 182 could be shifted or otherwise adjusted based on movement of side rails 128, 130, 132, 134. Other configurations are contemplated.

In some versions, one or more barrier sensors 172B may be employed to sense the presence of certain barriers 127, and the controller 156 may be configured to alter operation of the perimeter load detection system 161 based on changes in the presence, absence, and/or configuration of barriers 127. Put differently, if the patient support apparatus 100 is configured with removable barriers 127, the controller 156 may define the predetermined load criteria LC, the ligature safety zone 180, and/or the ligature risk zone 182 differently based on whether or not a removable barrier 127 is present, and/or when a specific type of barrier 127 is detected (e.g., one presenting fewer or more ligature risk locations 178). In some versions, the controller 156 may be configured to make similar determinations based on user selections made via the user interface 158 rather than via barrier sensors 172B, such as to allow a caregiver, service technician, or another user to define the specific configuration of the patient support apparatus 100 via the user interface 158. Other configurations are contemplated.

Referring again to FIGS. 7A-7C, as noted above, in some versions the patient support apparatus 100 employs mounts 125 operatively attached to the support structure 102 to, among other things, support certain components or serve as attachment points for accessory devices. Here, for example, barriers 127 may be coupled to one or more mounts 125 to at least partially limit egress across the periphery P of the patient support surface 116. In some versions, barriers 127 may be realized as side rails 128, 130, 132, 134, and/or as end boards 135 such as headboards 136 and/or footboards 138. In some versions, the mounts 125 are coupled to the intermediate frame 108 to support certain barriers 127 (e.g., the headboard 136, the footboard 138, the third side rail 132, the fourth side rail 134, and the like). In some versions, the mounts 125 are coupled to one or more deck sections 114 to support certain barriers 127 (e.g., the first side rail 128, the second side rail 130, and the like). However, it will be appreciated that mounts 125 could be disposed in other locations about the support structure 102, including various locations which could present a ligature risk. In some versions, the mounts 125 are specifically configured to releasably couple to a patient restraint 194 (see FIG. 7A, depicted schematically). Other types and configurations of mounts 125 are contemplated, including mounts 125 which may support medical devices or equipment such as IV poles, pumps, traction devices, and the like.

As noted above, ligature risk locations 178 may be defined in various places, locations, and the like about the patient support apparatus 100, including without limitation the mounts 125, the caregiver interfaces 140, or other portions of the barriers 127 and/or support structure 102. In some versions, one of the mounts 125 may define one or more of the ligature risk locations 178 which, in turn, may define one or more of the ligature risk zones 182. However, it will be appreciated that ligature risk locations 178, as well as ligature risk zones 182, can be defined by portions of the patient support apparatus 100 other than the mounts 125 as noted above.

In some versions, the controller 156 is configured to define the predetermined load criteria LC based on the distribution of load acting on the support structure 102 being concentrated within one of the ligature risk zones 182 defined adjacent to the mount 125. Put differently, the controller 156 may be configured to interrupt operation of the perimeter load detection system 161 and not generate the ligature risk event alert A1 when the load distribution determined via the sensor system 160 indicates that the load is concentrated both outside of the ligature safety zone 180 and within at least one ligature risk zone 182. In some versions, the ligature risk zone 182 may be spaced from the ligature safety zone 180. However, other configurations are contemplated, and one or more ligature risk zones 182 may at least partially overlap the ligature safety zone 180 and/or other zones. In some versions, such as is depicted in FIG. 12, a plurality of different ligature risk zones 182 may be defined about the patient support apparatus 100. Here, some ligature risk zones 182 may be associated with a single ligature risk location 178 (e.g., a particular mount 125), or may be associated with multiple ligature risk locations 178. The specific shapes and arrangements of the ligature risk zones 182 may be configured based on a number of different factors, and may be shaped similarly to each other or may be different from one another, depending such as on the specific configuration of the patient support apparatus 100. Here too, one or more of the ligature risk zones 182 may be adjustable via the user interface 158 and/or based on changes determined via various sensors 172. The ligature risk zones 182 may extend beyond the footprint of the patient support apparatus 100 in various ways. Other configurations are contemplated.

In some versions, one or more ligature risk zones 182 associated with mounts 125 may be defined based on mount sensors 172N coupled directly or indirectly to the mount 125. By way of non-limiting examples, mounts 125 supporting linkages 139 for side rails 128, 130, 132, 134 (and/or the linkages 139 or a portion of the side rails 128, 130, 132, 134 themselves) may be provided with mount sensors 172N arranged to sense changes in load across the mount 125. For example, one of the linkages 139 coupling the third side rail 32 to its mounts 125 may include a mount sensor 172N realized as an additional load cell arranged to sense load between the third side rail 132 and the intermediate frame 108. This additional load cell defining the mount sensor 172N may be realized as a part of the sensor system 160, but may not be provide to measure weight acting on the patient support deck 110. Put differently, the controller 156 may issue the ligature risk event alert A1 based on predetermined changes in load occurring within the ligature risk zone 182 associated with the mount sensor 172N that are sensed or otherwise determined via that mount sensor 172N and not necessarily via the plurality of load cells 184 of the sensor system 160. It will be appreciated that the controller 156 may issue the ligature risk event alert A1 based on changes in the load cells 184 of the sensor system 160 (e.g., indicating load acting outside of the ligature safety zone 180) and/or based on changes in the mount sensor 172N (e.g., indicating load acting inside one of the ligature risk zones 182). The mount sensor 172N can be realized in a number of different ways, such as by various arrangements of load cells, strain gauges, touch sensors, contact sensors, encoders, potentiometers, and the like. Other configurations are contemplated.

In some versions, the controller 156 is further configured to issue a mattress tampering alert M1 in response to the data D generated by the sensors system 160 satisfying a predetermined tamper criteria TC indicating changes in the distribution of load acting on the support structure 102 which are associated with at least partial removal of the mattress 126 from the patient support deck 110. Here, for example, the mattress 126 may define a mattress weight WM and the controller 156 may be configured to define the predetermined tamper criteria TC based on the mattress weight WM, such as where the mattress tampering alert M1 is issued in response to a change in load that is substantially equivalent to the mattress weight WM to indicate removal of the mattress 126 from the patient support deck 110. In some versions, the mattress weight WM can be determined or otherwise set via the user interface 158, such as by allowing the caregiver or another user to select the type of mattress 126 being utilized from a plurality of different mattress 126 types each having a respective mattress weight WM known to the controller 156 (e.g., stored in memory). In some versions, the mattress weight WM can be determined via a process which may be guided via the user interface 158, such as by taring the load cells 184 without the mattress 126 and subsequently placing the mattress 126 on the patient support deck 110, and then storing the mattress weight WM based on the difference. The load cells 184 could then be re-tared before a patient is supported on the mattress 126. Other configurations are contemplated.

The controller 156 may activate the local alarm 162 and/or the remote alarm 164 in order to communicate the mattress tampering alert M1 to the patient and/or to the caregiver (or others nearby). In some versions, the local alarm 162 and/or the remote alarm 164 are activated differently to communicate the ligature risk event alert A1 in a different way from the mattress tampering alert M1 (e.g., with a different audible tone) and/or other alerts. Other configurations are contemplated. In some version, the controller 156 is configured to continue generating the mattress tampering alert M1 until the mattress 126 is returned to the patient support deck 110.

In some versions, either instead of or in addition to utilizing the sensor system 160 to evaluate changes based on the mattress weight WM, the patient support apparatus 100 may include a mattress sensor 172M to determine movement of the mattress 126 relative to the patient support deck 110, and may issue the mattress tampering alert M1 in response to at least partial removal of the mattress 126 determined with the mattress sensor 172M. Here, similar to the mount sensor 172N described above, the controller 156 could be configured to sense the mattress tampering alert M1 independent of the sensor system 160 via the mattress sensor 172M. In some versions, the mattress sensor 172M may be realized with one or more contact sensors, touch sensors, proximity sensors, force sensors, vision senso, photoelectric sensors, and the like arranged to sense lift-off of the mattress 126 from the patient support deck 110. In some versions, multiple mattress sensors 172M arranged in spaced relation from each other (e.g., adjacent to the corners of the mattress 126) may be utilized to determine complete removal of the mattress 126 from the patient support deck 110, and/or to determine partial removal of the mattress 126 from the patient support deck 110. In some versions, the controller 156 is configured to interrupt monitoring for removal of the mattress 126 when the patient is disposed on the patient support surface 116. Put differently, the controller 156 may be configured to issue the mattress tampering alert M1 when the patient's weight is not sensed via the load cells 184 or another patient monitoring system. Other configurations are contemplated.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient support apparatus for use in treating patients with behavioral health indicia, the patient support apparatus comprising:

a support structure including a patient support deck defining a patient support surface, the support structure including one or more ligature risk locations arranged outside of a ligature safety zone defined relative to the patient support surface;

a sensor system coupled to the support structure to generate data representing load acting on the support structure; and a controller disposed in communication with the sensor system and configured to issue a ligature risk event alert in response to the data generated by the sensor system satisfying a predetermined load criteria indicating a distribution of load acting on the support structure outside of the ligature safety zone for a predetermined period.

II. The patient support apparatus of clause I, further comprising a local alarm operatively attached to the support structure and disposed in communication with the controller, the local alarm being configured to generate a local alarm output in response to the controller issuing the ligature risk event alert.

III. The patient support apparatus of clause II, wherein the local alarm comprises an audible alarm.

IV. The patient support apparatus of any of clauses II-III, further comprising a user interface arranged for user engagement; and wherein the predetermined period is adjustable via the user interface.

V. The patient support apparatus of any of clauses II-IV, wherein the predetermined period is further defined as a first predetermined period; and wherein the controller is further configured to issue a second ligature risk event alert in response to the data generated by the sensor system satisfying the predetermined load criteria for a second predetermined period beyond the first predetermined period.

VI. The patient support apparatus of clause V, further comprising a communication interface in communication with the controller to activate a remote alarm in response to the controller issuing the second ligature risk event alert.

VII. The patient support apparatus of any of clauses V-VI, wherein the first predetermined period is approximately ten seconds, and the second predetermined period is approximately five seconds beyond the ten seconds of the first predetermined period.

VIII. The patient support apparatus of clause I, wherein the support structure further includes:

a base, and an intermediate frame supporting the patient support deck.

IX. The patient support apparatus of clause VIII, further comprising a lift mechanism interposed between the base and the patient support deck to move the intermediate frame relative to the base between a plurality of vertical configurations including a maximum lowered configuration; and wherein the controller is further configured to drive the lift mechanism to move the intermediate frame between the plurality of vertical configurations.

X. The patient support apparatus of clause IX, further comprising a lift sensor disposed in communication with the controller to determine an arrangement of the intermediate frame relative to the base.

XI. The patient support apparatus of clause X, wherein the controller is further configured to monitor the data generated by the sensor system relative to the predetermined load criteria in response to the intermediate frame being arranged in a predetermined lift configuration.

XII. The patient support apparatus of clause XI, further comprising a user interface arranged for user engagement; and wherein the predetermined lift configuration is adjustable via the user interface.

XIII. The patient support apparatus of any of clauses XI-XII, wherein the predetermined lift configuration is defined with the intermediate frame arranged in one of the plurality of vertical configurations other than the maximum lowered configuration.

XIV. The patient support apparatus of any of clauses X-XIII, wherein the controller is further configured to define the predetermined load criteria based at least partially on the arrangement of the intermediate frame relative to the base determined with the lift sensor.

XV. The patient support apparatus of any of clauses VIII-XIV, wherein the sensor system includes a plurality of load cells interposed in force-translating relation between the intermediate frame and the base to measure load acting on the support structure.

XVI. The patient support apparatus of any of clauses VIII-XV, wherein the patient support deck includes a deck section arranged for movement relative to the intermediate frame to adjust the patient support deck between a plurality of patient support positions.

XVII. The patient support apparatus of clause XVI, further comprising a deck sensor disposed in communication with the controller to determine an arrangement of the deck section relative to the intermediate frame.

XVIII. The patient support apparatus of clause XVII, wherein the controller is further configured to define the predetermined load criteria based at least partially on the arrangement of the deck section relative to the intermediate frame determined with the deck sensor.

XIX. The patient support apparatus of any of clauses I-XVIII, wherein the support structure further includes a base, and an intermediate frame supporting the patient support deck; and wherein the sensor system includes a plurality of load cells arranged to determine weight applied to the intermediate frame relative to the base, with each of the plurality of load cells being configured to generate a respective output signal.

XX. The patient support apparatus of clause XIX, wherein the controller is further configured to define the predetermined load criteria based at least partially on an amount of weight applied to the intermediate frame relative to the base determined with the plurality of load cells.

XXI. The patient support apparatus of any of clauses XIX-XX, further comprising a mattress disposed on the patient support deck.

XXII. The patient support apparatus of clause XXI, wherein the controller is further configured to issue a mattress tampering alert in response to the data generated by the sensor system satisfying a predetermined tamper criteria indicating changes in the distribution of load acting on the support structure associated with at least partial removal of the mattress from the patient support deck.

XXIII. The patient support apparatus of clause XXII, wherein the mattress defines a mattress weight; and wherein the controller is further configured to define the predetermined tamper criteria based on the mattress weight.

XXIV. The patient support apparatus of clause XXIII, wherein the controller further configured to issue the mattress tampering alert in response to a change in load substantially equivalent to the mattress weight to indicate removal of the mattress from the patient support deck.

XXV. The patient support apparatus of any of clauses XXI-XXIV, further comprising a mattress sensor to determine movement of the mattress relative to the patient support deck; and wherein the controller is further configured to issue a mattress tampering alert in response to at least partial removal of the mattress determined with the mattress sensor.

XXVI. The patient support apparatus of any of clauses I-XXVI, wherein the ligature safety zone includes a peripheral edge defined adjacent to a periphery of the patient support surface.

XXVII. The patient support apparatus of clause XXVI, wherein the peripheral edge is spaced inwardly from the periphery of the patient support surface by a predetermined periphery offset value.

XXVIII. The patient support apparatus of any of clauses I-XXVII, further including a mount operatively attached to the support structure; and wherein the mount defines at least one of the one or more ligature risk locations.

XXIX. The patient support apparatus of clause XXVIII, wherein the controller is further configured to define the predetermined load criteria based on the distribution of load acting on the support structure being concentrated within a ligature risk zone defined adjacent to the mount.

XXX. The patient support apparatus of clause XXIX, wherein the ligature risk zone is spaced from the ligature safety zone.

XXXI. The patient support apparatus of any of clauses XXVIII-XXX, wherein the mount is configured to releasably couple to a patient restraint.

XXXII. The patient support apparatus of any of clauses XXVIII-XXXI, further comprising a barrier coupled to the mount to at least partially limit egress across a periphery of the patient support surface.

XXXIII. The patient support apparatus of clause XXXII, wherein the barrier comprises an end board.

XXXIV. The patient support apparatus of clause XXXII, wherein the barrier comprises a side rail.

XXXV. The patient support apparatus of clause XXXIV, further including a linkage interposed between the mount and the side rail to move the side rail relative to the support structure between a plurality of side rail positions.

XXXVI. The patient support apparatus of clause XXXV, further comprising a barrier sensor disposed in communication with the controller to determine an arrangement of the side rail relative to the support structure.

XXXVII. The patient support apparatus of clause XXXVI, wherein the controller is further configured to define the predetermined load criteria based at least partially on the arrangement of the side rail relative to the support structure determined with the barrier sensor.

XXXVIII. The patient support apparatus of any of clauses I-XXXVII, wherein the support structure includes a base with a plurality of wheels arranged for movement about floor surfaces; and further comprising a brake assembly operatively attached to one or more of the plurality of wheels and being operable between: a braked state to inhibit movement of the base about floor surfaces, and an unbraked state to permit movement of the base about floor surfaces.

XXXIX. The patient support apparatus of clause XXXVIII, further comprising a brake sensor disposed in communication with the controller to determine operation of the brake assembly between the braked state and the unbraked state.

XL. The patient support apparatus of clause XXXIX, wherein the controller is further configured to interrupt monitoring the data generated by the sensor system relative to the predetermined load criteria during operation of the brake assembly in the unbraked state determined by the brake sensor.

XLI. The patient support apparatus of any of clauses I-XL, further comprising a bed exit monitoring system in communication with the controller to determine one or more of: patient movement about the patient support surface corresponding to a pre-exit condition, and patient movement off of the patient support surface.

XLII. The patient support apparatus of clause XLI, further comprising a user interface arranged for user engagement and disposed in communication with the controller to operate the bed exit monitoring system between: a monitoring state to monitor patient movement relative to the patient support surface, and an off state; and wherein the controller is further configured to interrupt monitoring the data generated by the sensor system relative to the predetermined load criteria during operation of the bed exit monitoring system in the monitoring state.

XLIII. A patient support apparatus for use in treating patients with behavioral health indicia, the patient support apparatus comprising:

a support structure including a patient support deck defining a patient support surface, the support structure including one or more ligature risk locations arranged within one or more ligature risk zones defined relative to the patient support surface;

a sensor system coupled to the support structure to generate data representing load acting on the support structure; and a controller disposed in communication with the sensor system and configured to issue a ligature risk event alert in response to the data generated by the sensor system satisfying a predetermined load criteria indicating a distribution of load acting on the support structure within the one or more ligature risk zones for a predetermined period.

XLIV. A patient support apparatus for use in treating patients presenting behavioral health symptoms, the patient support apparatus comprising:

a support structure including a patient support deck defining a patient support surface;

a mount operatively attached to the support structure and supporting a barrier to at least partially limit egress across a periphery of the patient support surface;

a sensor system coupled to the support structure to generate data representing load acting on the support structure; and a controller adapted to issue a ligature risk event alert in response to changes occurring in the data generated by the sensor system indicating a distribution of load acting on the support structure concentrated adjacent to the mount according to a predetermined load concentration criteria.

What is claimed is:

1. A patient support apparatus for use in treating patients with behavioral health indicia, the patient support apparatus comprising:

a support structure including a patient support deck defining a patient support surface, the support structure including one or more ligature risk locations arranged outside of a ligature safety zone defined relative to the patient support surface;

a sensor system coupled to the support structure to generate data representing load acting on the support structure; and a controller disposed in communication with the sensor system and configured to issue a ligature risk event alert in response to the data generated by the sensor system satisfying a predetermined load criteria indicating a distribution of load acting on the support structure outside of the ligature safety zone for a predetermined period.

2. The patient support apparatus of claim 1, further comprising a local alarm operatively attached to the support structure and disposed in communication with the controller, the local alarm being configured to generate a local alarm output in response to the controller issuing the ligature risk event alert.

3. The patient support apparatus of claim 2, further comprising a user interface arranged for user engagement; and wherein the predetermined period is adjustable via the user interface.

4. The patient support apparatus of claim 2, wherein the predetermined period is further defined as a first predetermined period; and wherein the controller is further configured to issue a second ligature risk event alert in response to the data generated by the sensor system satisfying the predetermined load criteria for a second predetermined period beyond the first predetermined period; and further comprising a communication interface in communication with the controller to activate a remote alarm in response to the controller issuing the second ligature risk event alert.

5. The patient support apparatus of claim 1, wherein the support structure includes a base and an intermediate frame supporting the patient support deck; and further comprising:

a lift mechanism interposed between the base and the patient support deck to move the intermediate frame relative to the base between a plurality of vertical configurations, wherein the controller is configured to drive the lift mechanism to move the intermediate frame between the plurality of vertical configurations, and a lift sensor disposed in communication with the controller to determine an arrangement of the intermediate frame relative to the base; and wherein the controller is further configured to define the predetermined load criteria based at least partially on the arrangement of the intermediate frame relative to the base determined with the lift sensor.

6. The patient support apparatus of claim 1, wherein the support structure further includes a base, and an intermediate frame supporting the patient support deck; and wherein the sensor system includes a plurality of load cells arranged to determine weight applied to the intermediate frame relative to the base, with each of the plurality of load cells being configured to generate a respective output signal.

7. The patient support apparatus of claim 6, wherein the controller is further configured to define the predetermined load criteria based at least partially on an amount of weight applied to the intermediate frame relative to the base determined with the plurality of load cells.

8. The patient support apparatus of claim 6, further comprising a mattress disposed on the patient support deck; and wherein the controller is further configured to issue a mattress tampering alert in response to the data generated by the sensor system satisfying a predetermined tamper criteria indicating changes in the distribution of load acting on the support structure associated with at least partial removal of the mattress from the patient support deck.

9. The patient support apparatus of claim 1, further comprising:

a mattress disposed on the patient support deck, and a mattress sensor to determine movement of the mattress relative to the patient support deck; and wherein the controller is further configured to issue a mattress tampering alert in response to at least partial removal of the mattress determined with the mattress sensor.

10. The patient support apparatus of claim 1, wherein the ligature safety zone includes a peripheral edge defined adjacent to a periphery of the patient support surface.

11. The patient support apparatus of claim 10, wherein the peripheral edge is spaced inwardly from the periphery of the patient support surface by a predetermined periphery offset value.

12. The patient support apparatus of claim 1, further including a mount operatively attached to the support structure; and wherein the mount defines at least one of the one or more ligature risk locations.

13. The patient support apparatus of claim 12, wherein the controller is further configured to define the predetermined load criteria based on the distribution of load acting on the support structure being concentrated within a ligature risk zone defined adjacent to the mount; and wherein the ligature risk zone is spaced from the ligature safety zone.

14. The patient support apparatus of claim 12, wherein the mount is configured to releasably couple to a patient restraint.

15. The patient support apparatus of claim 12, further comprising:

a side rail coupled to the mount to at least partially limit egress across a periphery of the patient support surface, a linkage interposed between the mount and the side rail to move the side rail relative to the support structure between a plurality of side rail positions, and a barrier sensor disposed in communication with the controller to determine an arrangement of the side rail relative to the support structure; and wherein the controller is further configured to define the predetermined load criteria based at least partially on the arrangement of the side rail relative to the support structure determined with the barrier sensor.

16. The patient support apparatus of claim 1, wherein the support structure includes a base with a plurality of wheels arranged for movement about floor surfaces; and further comprising a brake assembly operatively attached to one or more of the plurality of wheels and being operable between: a braked state to inhibit movement of the base about floor surfaces, and an unbraked state to permit movement of the base about floor surfaces.

17. The patient support apparatus of claim 16, further comprising a brake sensor disposed in communication with the controller to determine operation of the brake assembly between the braked state and the unbraked state; and wherein the controller is further configured to interrupt monitoring the data generated by the sensor system relative to the predetermined load criteria during operation of the brake assembly in the unbraked state determined by the brake sensor.

18. The patient support apparatus of claim 1, further comprising:

a bed exit monitoring system in communication with the controller to determine one or more of: patient movement about the patient support surface corresponding to a pre-exit condition, and patient movement off of the patient support surface, and a user interface arranged for user engagement and disposed in communication with the controller to operate the bed exit monitoring system between: a monitoring state to monitor patient movement relative to the patient support surface, and an off state; and wherein the controller is further configured to interrupt monitoring the data generated by the sensor system relative to the predetermined load criteria during operation of the bed exit monitoring system in the monitoring state.

19. A patient support apparatus for use in treating patients with behavioral health indicia, the patient support apparatus comprising:

a support structure including a patient support deck defining a patient support surface, the support structure including one or more ligature risk locations arranged within one or more ligature risk zones defined relative to the patient support surface;

a sensor system coupled to the support structure to generate data representing load acting on the support structure; and a controller disposed in communication with the sensor system and configured to issue a ligature risk event alert in response to the data generated by the sensor system satisfying a predetermined load criteria indicating a distribution of load acting on the support structure within the one or more ligature risk zones for a predetermined period.

20. A patient support apparatus for use in treating patients presenting behavioral health symptoms, the patient support apparatus comprising:

a support structure including a patient support deck defining a patient support surface;

a mount operatively attached to the support structure and supporting a barrier to at least partially limit egress across a periphery of the patient support surface;

a sensor system coupled to the support structure to generate data representing load acting on the support structure; and a controller adapted to issue a ligature risk event alert in response to changes occurring in the data generated by the sensor system indicating a distribution of load acting on the support structure concentrated adjacent to the mount according to a predetermined load concentration criteria.

* * * * *